United States Patent
Wibberley

(10) Patent No.: US 10,995,719 B2
(45) Date of Patent: May 4, 2021

(54) INJECTOR ARRANGEMENT FOR DIESEL ENGINES USING SLURRY OR EMULSION FUELS

(71) Applicant: COMMONWEALTH SCIENTIFIC AND INDUSTRIAL RESEARCH ORGANISATION, Acton (AU)

(72) Inventor: Louis James Wibberley, Garden Suburb (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 89 days.

(21) Appl. No.: 16/328,877

(22) PCT Filed: Aug. 29, 2017

(86) PCT No.: PCT/AU2017/050918
§ 371 (c)(1),
(2) Date: Feb. 27, 2019

(87) PCT Pub. No.: WO2018/039712
PCT Pub. Date: Mar. 8, 2018

(65) Prior Publication Data
US 2019/0211790 A1 Jul. 11, 2019

(30) Foreign Application Priority Data

Aug. 29, 2016 (AU) .................................. 2016903419
Dec. 23, 2016 (AU) .................................. 2016905343

(51) Int. Cl.
*F02M 61/04* (2006.01)
*F02M 59/02* (2006.01)
(Continued)

(52) U.S. Cl.
CPC ............. *F02M 61/04* (2013.01); *F02B 45/10* (2013.01); *F02D 19/04* (2013.01);
(Continued)

(58) Field of Classification Search
CPC ........ F02M 61/04; F02M 61/18; F02M 21/10; F02M 21/12; F02M 37/0023;
(Continued)

(56) References Cited

U.S. PATENT DOCUMENTS 3,145,694 A 8/1964 Crooks
4,782,794 A 11/1988 Hsu et al.
(Continued)

FOREIGN PATENT DOCUMENTS

WO WO-2013/142921 A1 10/2013
WO WO-2015/048843 A1 4/2015

OTHER PUBLICATIONS

International Search Report and Written Opinion in International Application No. PCT/AU2017/050918, dated Mar. 8, 2018 (12 pages).
(Continued)

*Primary Examiner* — Sizo B Vilakazi
*Assistant Examiner* — Anthony L Bacon
(74) *Attorney, Agent, or Firm* — Foley & Lardner LLP

(57) ABSTRACT

The present invention relates to a fuel injection arrangement for a diesel type engine configured to use carbonaceous aqueous slurry fuels. The fuel injection arrangement includes an injector nozzle for injecting fuel into a combustion chamber; a pump chamber housing a fuel pumping element for generating a pressurised fuel flow to the injector nozzle along an injection path between the pumping element and the injector nozzle; and a check valve connected to a fuel supply for regulating and supplying fuel to the injection path via a check valve outlet. A region immediately down-
(Continued)

stream of the check valve outlet defines an outlet region and the check valve is arranged to expose the outlet region to the pressurised fuel flow to facilitate flushing of the outlet region during fuel flow between the pumping element and the injector nozzle.

18 Claims, 12 Drawing Sheets

(51) Int. Cl.
    *F02M 55/02*     (2006.01)
    *F02D 19/04*     (2006.01)
    *F02M 37/00*     (2006.01)
    *F02B 45/10*     (2006.01)
    *F02D 19/06*     (2006.01)
    *F23K 5/12*     (2006.01)
    *F02M 61/18*     (2006.01)
    *F02M 67/00*     (2006.01)
    *F02M 59/36*     (2006.01)
    *F23D 1/00*     (2006.01)
    *F02M 37/04*     (2006.01)
    *F02M 21/10*     (2006.01)
    *F02M 57/02*     (2006.01)
    *F02M 21/12*     (2006.01)

(52) U.S. Cl.
    CPC ..... *F02D 19/0649* (2013.01); *F02D 19/0694* (2013.01); *F02M 21/10* (2013.01); *F02M 37/0023* (2013.01); *F02M 37/0029* (2013.01); *F02M 37/0047* (2013.01); *F02M 37/0064* (2013.01); *F02M 37/04* (2013.01); *F02M 55/02* (2013.01); *F02M 59/027* (2013.01); *F02M 59/365* (2013.01); *F02M 59/366* (2013.01); *F02M 61/18* (2013.01); *F02M 67/00* (2013.01); *F23D 1/00* (2013.01); *F23K 5/12* (2013.01); *F02M 21/12* (2013.01); *F02M 57/022* (2013.01); *F02M 2200/06* (2013.01); *F02M 2200/07* (2013.01); *F02M 2200/95* (2013.01); *Y02T 10/30* (2013.01)

(58) Field of Classification Search
    CPC ........... F02M 37/0029; F02M 37/0047; F02M 37/0064; F02M 37/043; F02M 55/02; F02M 59/027; F02B 45/10; F02D 19/04; F02D 19/0649; F02D 19/0694
    See application file for complete search history.

(56) References Cited

U.S. PATENT DOCUMENTS

| | | | |
|---|---|---|---|
| 4,825,842 A | | 5/1989 | Steiger |
| 4,862,837 A | * | 9/1989 | Holmes ................... F02D 19/04 123/23 |
| 4,932,847 A | * | 6/1990 | Leonard ................... F04B 9/107 417/392 |
| 5,056,469 A | | 10/1991 | Kimberley |
| 5,313,915 A | | 5/1994 | McDowell et al. |
| 2019/0032551 A1 | * | 1/2019 | Wibberley ......... F02M 63/0012 |
| 2019/0338712 A1 | * | 11/2019 | Wibberley .............. F02D 19/04 |
| 2020/0003169 A1 | * | 1/2020 | Imperato ................ F02D 19/04 |

OTHER PUBLICATIONS

K. Nicol "The direct injection carbon engine," IEA Clean Coal Centre report CCC/243, Dec. 2014—https://www.usea.org/sites/default/files/122014_The%20direct%20injection%20carbon%20engine_ccc243.pdf.

Wibberley L J, "Coal base-load power using micronised refined coal (MRC)," Energy Generation, pp. 35-39 (Jan.-Mar. 2011).

* cited by examiner

INJECTOR ARRANGEMENT FOR DIESEL ENGINES USING SLURRY OR EMULSION FUELS

PRIORITY CROSS REFERENCE

The present application is a U.S. National Phase Application under 35 U.S.C. § 371 of International Application No. PCT/AU2017/050918, filed on 29 Aug. 2017, which claims priority from Australian Provisional Patent Application No. 2016903419 filed 29 Aug. 2016 and Australian Provisional Patent Application No. 2016905343 filed 23 Dec. 2016, the contents of which are incorporated by reference into this specification.

TECHNICAL FIELD

The present invention generally relates to a fuel system for a diesel type engine using carbonaceous aqueous slurries or emulsion fuels. The invention particularly relates to a fuel injector arrangement of a diesel type engine using carbonaceous aqueous slurries or emulsion fuels and it will be convenient to hereinafter disclose the invention in relation to this exemplary application.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Current injection technology for conventional diesel and heavy fuel oil in diesel type engines employs pressure atomisation of relatively low viscosity fuel. For heavy fuel oils the fuel viscosity is controlled to 5-20 mPa·s by heating (up to 165 t) before it enters the engine high pressure injection pumps. Low pressure fuel is provided at relatively constant pressure (approximately 10-30 bar) to the fuel system. Fuel supply is typically controlled by either a plunger-type fuel pump or by a number of spring loaded check valves.

In response to the rising cost of conventional diesel fuel, an emerging technology is to replace conventional diesel fuel with carbonaceous aqueous slurry fuels which are relatively abundant and low cost. One such carbonaceous slurry fuel is exemplified in International Patent Publication No. WO2015048843, the contents of which will be understood to be incorporated into this specification by this reference.

Carbonaceous aqueous slurry fuels typically comprise an aqueous colloidal suspension of finely ground carbonaceous particles. The properties of the slurry fuels are therefore significantly different to conventional heavy fuel oils, in particular having higher viscosity and a tendency to destabilise and settle to form sludge. Whilst the formation of sludge more frequently occurs during periods of flow stagnation, sludge can also form during dynamic flow conditions and particularly where a flow path undergoes a sharp change in area or where the flow path favours the establishment of a stable eddy or a zone of stable recirculating flow. These conditions can permit carbonaceous particles to become statically deposited within the fuel system and lead to sludge formation. The production, transportation, storage and use of these fuels therefore cause a number of technical problems which have previously discouraged commercialisation.

In response to these problems, previous diesel engines adapted for carbonaceous aqueous slurry fuels have reconfigured certain conventional diesel engines components for improved performance with slurry fuels. One such example is provided in International Patent Publication No. WO2013142921 which teaches an improved atomiser injector for use with a particulate slurry fuel. Another example is provided in U.S. Pat. No. 5,056,469 which relates to a conventional diesel fuel pump used to hydraulically drive a shuttle piston in a coal-water slurry fuel injector assembly. The shuttle piston arrangement isolates the fuel pump from the slurry fuel which is incompatible for use in the fuel pump due to the sludge-forming and abrasive nature of slurry fuel.

Notwithstanding these previous improvements, a significant problem which remains is the formation of sludge in the region around the fuel inlet check valve which introduces the slurry fuel to the fuel pathway between the fuel pump and the atomiser nozzle. The settling of carbonaceous particulate and the formation of sludge in this region can lead to blocking or jamming of the check valve. Moreover, the formation of sludge or particulate deposits can periodically shed or mobilise resulting in blocking of the smaller downstream ducts, ports or the atomiser nozzle orifices. The formation of sludge in the region of the fuel inlet check valve can cause the valve to become clogged with compacted sludge leading to unreliable valve seating as well as sludge formation in ducting between the check valve and the pump-to-nozzle fuel pathway. In addition to potentially causing blockages and valve malfunctions upstream of the atomiser nozzle, agglomerated slurry fuel injected into the combustion chamber can cause ignition delay and incomplete combustion which leads to reduced engine performance, an increase in undesirable CO and hydrocarbon emissions, accelerated piston ring and cylinder wear, ring hamming and an overall reduction in engine longevity. Many of these problems can also occur when using emulsion fuels such as those produced from tar-like heavy fuel oil fractions due to the coalescence of the tar viscous droplets and the formation of tar deposits.

Previous attempts to address this issue have involved increasing the water content of the fuel to reduce its viscosity. However this results in a reduction in fuel specific energy resulting in reduced engine efficiency. Furthermore, diluted slurry fuel has a tendency to settle during storage.

Engines configured for use with carbonaceous slurry or emulsion fuels can be utilised in a variety of applications including land or water based power generators as well as mobile applications such as engines for locomotives or ships. As compared to engines configured for use with fuels having relatively high sulphur content, engines configured for use with carbonaceous slurry fuels do not require scrubbers in order to adhere to increasing sulphur emission regulations. In addition, carbonaceous slurry fuel engines emit lower nitrogen oxides due, in part, to lower peak combustion temperatures due to the cooling effect of the slurry. Furthermore, such engines are likely to emit lower unburned hydrocarbons. As such, engines configured for use with carbonaceous slurry fuels are becoming increasingly desirable.

It would therefore be desirable to provide an improved fuel injector arrangement for a diesel type engine configured to use carbonaceous aqueous slurry fuels that tends to reduce the formation of sludge in the region of the fuel inlet check valve thereby reducing the risk of blockages caused by the build-up and release of compacted sludge between the fuel inlet check valve and the pump-to-nozzle fuel pathway.

SUMMARY OF INVENTION

According to the present invention there is provided a fuel injection arrangement for a diesel type engine configured to use carbonaceous aqueous slurry fuels, the fuel injection arrangement including: an injector nozzle for injecting fuel into a combustion chamber; a pump chamber housing a fuel pumping element for generating a pressurised fuel flow to the injector nozzle along an injection path between the pumping element and the injector nozzle; and a check valve connected to a fuel supply for regulating and supplying fuel to the injection path via a check valve outlet, wherein a region immediately downstream of the check valve outlet defines an outlet region and wherein the check valve is arranged to expose the outlet region to the pressurised fuel flow to facilitate flushing of the outlet region during fuel flow between the pumping element and the injector nozzle.

The present invention advantageously exposes the check valve outlet region to the pressurised fuel flow in the injection path between the pumping element and the injector nozzle and, in this manner, reduces or eliminates the formation of undesirable sludge in the vicinity of the check valve outlet. The fuel inlet check valves of previous carbonaceous slurry engines are conventionally isolated from fuel flow between the pump and the nozzle (for example, communicating with the injection path via a narrow passageway or conduit). The present invention achieves a significant improvement upon this configuration by arranging the check valve such that the outlet region is regularly flushed by pressurised flow travelling along the injection path. In this manner, the present invention can reduce or eliminate undesirable 'dead zones' or areas of recirculation in the vicinity of the check valve outlet and immediately downstream therefrom. Exposure of the outlet region to said fuel flow advantageously minimises or eliminates a potentially stagnant volume of fuel immediately downstream of the check valve which is, instead, flushed in highly regular intervals by fuel flow along the injection path. The present invention also eliminates the need for a narrow duct or conduit connecting the check valve to the injection path which, in previous systems, the Applicant has discovered to be at risk of blockage due to sludge formation.

The reduction or elimination of sludge formation in the region of the fuel inlet check valve reduces the risk of blockages caused by the build-up and release of compacted sludge between the check valve and the injection path (i.e. the pump-to-nozzle fuel pathway). Advantageously, the present invention may improve the reliability, consistency and quality of slurry fuel injection by reducing the degradation, destabilisation or agglomeration of fuel volume immediately downstream of the check valve. The present invention may, in some instances, therefore enable the use of higher viscosity and lower quality slurry or emulsion fuels that are lower cost than existing slurry fuels but have previously been impractical for use with existing injection systems due to the above-noted problems with sludge formation.

The present invention is suitable for use in a variety of fuel injection systems. By way of example, the present invention is suitable for use in a conventional injection arrangement whereby a fuel pumping element comprising a plunger is housed within a pump chamber. In these systems, the pump chamber is in communication with an injector nozzle via a fuel duct or fuel conduit connecting the nozzle to the pump chamber. The injector nozzle typically includes an injector valve biased to a normally closed position to regulate the injection of fuel into the combustion chamber. In this arrangement, downward movement of the plunger reduces the volume of the pump chamber causing an increase in pressure within the volume of fuel occupying the pump chamber and the fuel duct. This pressure increase overcomes the bias in the normally closed injector valve which moves to an open position in which fuel is permitted to spray from the injector nozzle into the combustion chamber. The release of fuel into the combustion chamber reduces pressure upstream of the injector nozzle causing the injector nozzle valve to return to its normally closed position whereupon spray through the injector nozzle is terminated. The pressurised fuel flow generated by the plunger travels away from the plunger and toward the injector nozzle via an injection path which is therefore defined by the collective volumes of the pump chamber and the fuel duct.

In previous fuel injection arrangements, the outlet region immediately downstream of the check valve is exposed only to the fuel flow extending through the check valve toward the injection path. This flow is typically generated by a relatively low pressure fuel pump upstream of the check valve. After an injection event, upward movement of the plunger causes a pressure decrease in the injection path (i.e. on the downstream side of the check valve) resulting in a pressure differential at the check valve. This pressure differential overcomes the normally-closed bias of the check valve and actuates movement of the check valve to an open position in which fuel flows through the check valve toward the injection path. This flow is of relatively low pressure/velocity and is generally insufficient to adequately flush and circulate flow in the outlet region so as to reduce or eliminate sludge formation. Advantageously, the present invention utilises the significantly higher pressure/velocity fuel flow between the pump chamber and injector nozzle to flush the outlet region and thereby reduce or eliminate sludge formation thereabouts.

As noted above, the present invention is suitable for use with existing fuel injection arrangements which utilise a plunger-type fuel pumping element and a pressure-actuated injector nozzle. However it will be appreciated that these are merely some examples of a fuel pumping element and injector nozzle with which the present invention can be used. A variety of alternative fuel pumping systems and injector nozzles are suitable for use with the present invention. For example, the pump chamber and pumping element of the present invention may comprise any type of appropriate flow generating device for example a centrifugal pump, moving cavity pump, or a positive displacement pump such as a diaphragm pump. In embodiments of the invention where the fuel pumping element comprises a piston or plunger-type pumping element, the piston/plunger can be operated by a variety of actuation systems for example a cam arrangement, hydraulic arrangement or by an electronic solenoid system. Similarly, the injector nozzle of the present invention can be a conventional type injector nozzle (i.e. actuated to its open position by increasing pressure within the injection path) or, alternatively, could be selectively actuated by a separate system (for example a hydraulic or electronic system) to provide increased control over the injection events into the combustion chamber which, in some engine systems, are precisely timed to achieve increased combustion efficiency.

According to the present invention, the check valve may be arranged in a variety of different ways which permit exposure of the outlet region to fuel flow in the injection path. In a particular embodiment of the invention, the check valve is integrated within an injection path wall at a periphery of the injection path. The injection path wall can consist of any wall located at an edge or boundary of the injection path for example a wall of the pump chamber or a wall of the fuel duct. Integrating the check valve within the injection path wall advantageously locates the check valve and its associate outlet region generally proximate to the injection path and therefore positions the outlet region for exposure to the pressurised fuel flow travelling through the injection path.

In some forms of the invention, the outlet region is located within the injection path. By way of example, the check valve outlet can be positioned sufficiently close to the pump chamber or to the fuel duct such that the volume immediately downstream of the check valve outlet occupies a portion of the pump chamber or the fuel duct and thereby occupies a portion of the injection path. In some instances, this form of the invention can advantageously locate the outlet region for maximum flushing exposure to fuel flow along the injection path.

In a particular example of this configuration, the check valve includes a valve seat which defines a depression in the injection path wall. The valve seat is therefore integrated within the wall with the outer edges of the valve seat depression extending outwardly from the injection path wall (i.e. away from the injection path). The valve seat depression can be a conical depression and can be located within a wall of the pump chamber or, alternatively, within a wall of the fuel duct extending between the pump chamber and the injector nozzle. In this configuration, the check valve outlet can be approximately 'flush' or co-planar with the injection path wall. Locating the valve seat depression within the injection path wall may, in some instances, position the check valve outlet for maximum exposure to the fuel flow within the fuel path and therefore maximum flushing of the outlet region. Forming the valve seat as a depression within the injection path wall advantageously locates the check valve outlet at the immediate periphery of the injection path without extending beyond the injection path wall which could, in some instances, provide an undesirable obstruction within the injection path.

However, in some alternative embodiments of the invention, the check valve outlet may be configured to protrude beyond the injection path wall into the injection path, for example into the volume defined by the pump chamber or the fuel duct. The check valve seat could, for example, be located at end of a protrusion which extends into the pump chamber or valve seat i.e. through and beyond a wall of the pump chamber or fuel duct. In this regard, the valve seat could potentially be located inwardly of the injection path wall, within the injection path volume. According to a particular embodiment of the invention the check valve includes a valve seat located on a protrusion which extends into the injection path.

Whilst location of the outlet region within the injection path may typically provide maximum flushing exposure of the outlet region, in alternative embodiments of the invention, the outlet region need not necessarily be located within the injection path to achieve exposure to the fuel flow therethrough. In some embodiments of the invention, the outlet region can be located adjacent to the injection path. For example, the outlet region can be offset or recessed away from the injection path extending through the pump chamber and the fuel duct. In these embodiments, the outlet region can be nonetheless located for indirect exposed to fuel flow within the injection path notwithstanding its position adjacent thereto.

In a particular example of this arrangement, the outlet region is located within a recess in the injection path wall, for example the valve seat and associated outlet region may be located in a recess within in a wall of the pump chamber or the fuel duct. In a particular form of the invention, the recess includes a recess opening in the injection path wall. The juncture of the recess and the injection path wall can therefore define an opening in the injection path wall connecting the volume of the recess to the injection path. The volume of the recess can encounter a portion of the fuel flow in the injection path, through the recess opening, by virtue of the recess's proximity to the injection path. The extent of fuel flow to which the volume of the recess (and the outlet region contained therein) is exposed can depend on the fuel viscosity and the particular turbulent flow patterns of the injection path but also on the structural parameters of the recess.

Accordingly, in a particular embodiment of the invention, the exposure of the outlet region to fuel flow in the injection path is facilitated by the configuration of the recess. By way of example, the proportions or shape of the recess may be configured to facilitate exposure of the outlet region within the recess. In a particular embodiment, the check valve includes a valve seat having a cross-sectional area equal to or less than a minimum cross-sectional area of the recess. It will be appreciated that the cross-sectional area of the valve seat and of the recess are measured generally perpendicular to the direction of fuel flow. Accordingly, the cross-sectional area of the recess may affect the degree to which the check valve outlet region is exposed to fuel flow in the injection path. Embodiments of the present invention in which the cross-sectional area of the recess is at least as large as the cross-sectional area of the recess facilitate exposure of the check valve outlet to flushing effects of the injection path fuel flow by avoiding points of flow choking or constriction. This represents a significant advantage over prior art arrangements wherein the check valve outlet is connected to the injection path by a narrow conduit. These prior arrangements undesirably isolate the check valve outlet region from the injection path fuel flow by, firstly, spacing the check valve outlet too far apart from the injection path and, secondly, due to the conduit having a cross-sectional area smaller than the cross-sectional area of the valve seat.

In a particular embodiment of the invention in which the valve seat and the recess are both circular, the recess may therefore have a minimum diameter equal to or greater than a diameter of the valve seat. It will be appreciated that providing the recess with an area no smaller than the diameter of the valve seat desirably facilitates or promotes entry of fuel flow from the injection path, through the recess opening and into the volume of the recess. The recess can have a constant cross section. Alternatively, the recess could be provided with an expanding cross section having its smallest or narrowest portion at the valve seat and increasing in cross section toward the injection path such that the area of the recess opening is larger than the area of the valve seat.

In addition to recess cross sectional structure, another adjustable parameter by which the structure of the recess can be configured to promote fuel flow therethrough is the recess proportions or aspect ratio of the recess. It will be appreciated that an overly narrow or lengthy recess may typically reduce or prevent exposure of the recess volume to fuel flow in the adjacent injection path. A ratio of recess aspect ratio may be defined as a distance between the recess length to the outer circumference of the valve seat. The recess length is defined as the distance between the recess opening (i.e. the interface of the recess and the injection path) to the valve seat located at the outer end of the recess, opposite to the recess opening. In a particular embodiment of the invention, the ratio of recess length to valve seat diameter is in the range of between 0 to 5. In particular embodiments of the invention, the ratio is in the range of between 0 to 3. In some embodiments of the invention, the ratio is in the range of between 0 to 2. In some embodiments of the invention, the ratio is in the range of 0 to 1. In some embodiments of the invention, the ratio is in the range of 0 to 0.5. It will be appreciated that an increase in ratio corresponds to an increase in recess length and/or a decrease in valve seat diameter, either of which may, in some instances, generally reduce the extent to which the recess volume is exposed to fuel flow along the injection path. For this reason, it may be generally desirable to form the recess with a length to valve seat diameter as close to 0 as possible. Nonetheless, exposure of the outlet region within the recess to injection path fuel flow can occur with ratios greater than 0 and therefore these recess structures also fall within the scope of the present invention. By way of example, a recess length to valve seat diameter ratio of 1 corresponds to a valve seat within a recess having a recess length equal to the diameter of the valve seat. That is, the valve seat is spaced apart from the recess opening by a distance equal to its diameter. A recess of this ratio will generally have an opening sufficiently large to expose the outlet region within the recess to the flushing effects of the injection path fuel flow so as to reduce or eliminate the formation of sludge within the outlet region.

It will be appreciated that a ratio of 0 would correspond to the outer diameter of the valve seat being located in the same plane as the recess opening such that no recess is present, but rather the valve seat itself defines a depression in the injection path wall. Accordingly, in describing the possible proportions of a recess which contains the valve sea, the ratio of recess length to valve seat diameter is described as being greater than 0. However, as noted above, it will be appreciated that a ratio of 0 is a possible, albeit alternative, embodiment of the present invention.

The recess may be formed in a variety of shapes or structures, each of which falls within the scope of the present invention. By way of example, the recess can be cuboidal, cylindrical, bell-shaped, frustoconical or define a trapezoidal prism, pyramid-shaped or rectangular prism.

Preferably, the passageway (e.g. the recess) between the valve and the pump-nozzle fuel pathway has a minimum diameter ($D_P$) which is greater or equal to 0.5 and more preferably greater or equal to 0.8 the diameter of the seat value (D). It will be appreciated that a $D_P$/D value which is equal to or greater than 1.0 corresponds to an arrangement without any constriction between the valve outlet and the injection path. The upper limit of the $D_P$/D value is preferably no more than 1.5 and even more preferably no more than 1.2.

The above discussion relates to various arrangements of the check valve whereby the outlet region immediately downstream of the check valve outlet is exposed to the flushing effects of fuel flow along the injection path between the pumping element and the injector nozzle. Accordingly, whilst the outlet region is arranged for flushing exposure, the check valve itself need not necessarily be exposed to the fuel flow in the injection path. However, in a particular embodiment of the invention, a downstream surface of the check valve is exposed to fuel flow between the pumping element and the injector nozzle. By way of example, the check valve can be arranged in relatively close proximity to the injection path such that a portion of the check valve itself, as well as its associated outlet region, is exposed to fuel flow along the injection path. The check valve surface or component which is exposed to the fuel flow can vary depending on the type of check valve used. It will be appreciated that fuel flow along the injection path typically occurs when the check valve is closed such that the valve seat would usually not be exposed to fuel flow in the injection path. However components of the check valve which operate to seat within and close the valve seat opening (for example the valve head of a poppet valve) could also be located for exposure to fuel flow within the injection path. This embodiment of the invention can advantageously reduce sludge formation on or around the valve componentry as well as sludge formation in the outlet region immediately downstream of the check valve.

As noted above, the injection path is defined by the collective volume of the pump chamber and the fuel duct as these are the volumes through which the fuel flow passes toward the injector nozzle, under influence of the pumping element. As noted above, the check valve can be integrated within a wall of the pump chamber whereby the check valve will therefore communicate directly with the pump chamber. Alternatively, the check valve can be integrated within a wall of the fuel duct connecting the pump chamber to the injector nozzle whereby the check valve communicates directly with the fuel duct. Given that the injection path encompasses the volumes of the pump chamber and the fuel duct, it will be appreciated that either of these configurations involve the check valve regulating and supplying fuel to the injection path.

The check valve can therefore be provided in a variety of locations, each within the scope of the present invention. In embodiments of the invention where the check valve is integrated within a wall of the pump chamber, the check valve can be integrated within a base wall of the pump chamber or, alternatively, within a side wall of the pump chamber.

The fuel duct can, in some injector systems, be defined by a passageway or bore extending through a solid volume, for example a bore extending through a metal block. In this instance, the check valve can be located within the metal block, adjacent to the bore so as to be integrated into a wall of the fuel duct.

The present invention is suitable for use with a variety of known check valve configurations, for example an inward or outward opening poppet-valve, ball-valve, diaphragm valve, clapper or swing valve and the like. The check valve may be normally closed by virtue of a closure bias applied by a mechanical spring. Opening movement of the check valve can, in some embodiments, be actuated by a pressure differential between the upstream and downstream sides of the check valve which overcomes the closure bias. In alternative embodiments of the invention, an electronic solenoid or separate hydraulic system could be used to actuate opening movement of the check valve. For example, the check valve can be actuated by a check valve actuation system independent of fuel pressure within the injection arrangement. Operation of the check valve can therefore be controlled by means other than the rising and falling fuel pressure within the injection path and separately to operation of the fuel pumping element. Advantageously, this form of the invention may allow for the opening/closing timing of the check valve to be precisely controlled which, in some instances, could allow for tuning to achieve optimal fuel injection leading to increased engine efficiency. The check valve could, for example, be actuated by a hydraulic actuation fluid in a hydraulic line external to the injection path or by electronic means such as a solenoid. The check valve actuation system could, for example, be connected to an electronic engine control unit or to a separate cam arrangement such that the timing of fuel pulses delivered through check valve are independent from the movement of the fuel pumping element.

A fuel injection arrangement according to the present invention could be integrated within a unitary device such as a unit injector. Accordingly, the present invention also relates to a unit injector or injector device which includes the above discussed a fuel injection arrangement.

The present invention also relates to a diesel type engine configured to use carbonaceous aqueous slurry fuels including the above discussed fuel injection arrangement. A diesel type engine including the fuel injection arrangement of the present invention may, for example, comprise a power generation engine and therefore be integrated within a static power producing installation. Alternatively a diesel type engine including the injection arrangement of the present invention may comprise a transportation engine such as a locomotive engine or an engine for an ocean-going vessel. The fuel injection arrangement of the present invention is suitable for use with a diesel type engine such as a compression ignition type engine. The present invention is particularly adapted for use with a suitable direct-injection compression ignition type engine.

The present invention also relates to use of use of carbonaceous aqueous slurry or emulsion fuel in a diesel type engine having the above-described fuel injection arrangement. The fuel suitable for use with the present invention can include a fuel having carbonaceous particles suspended in an aqueous solvent. In one example, the fuel can have a viscosity that is greater than or equal to about 1000 mPa·s at 25° C. for shear rates of up to 750/s. According to an aspect of the present invention, there is provided a diesel type engine when used with a fuel having carbonaceous particles suspended in an aqueous solvent and a viscosity that is greater than or equal to about 1000 mPa·s at 25° C. for shear rates of up to 750/s.

The present invention is also suitable for use with fuels of lower viscosity for example conventional type fuel oils such as conventional diesel fuel. The present invention is also suitable for use in dual-fuel engine systems configured to run on conventional diesel and to be selectively switched to run on carbonaceous slurry fuel. Persons skilled in art will appreciate that the mixing of diesel fuel with carbonaceous slurry fuels can creates an undesirable thick sludge which tends to clog engine systems. Advantageously, an injector arrangement according to the present invention facilitates fast and thorough fuel flushing when switching between fuel types. When switching from diesel fuel to carbonaceous slurry fuel, the present invention therefore reduces or eliminates residual diesel fuel remaining in the fuel pathway upon introduction of carbonaceous slurry fuel. The present invention reduces the potential for residual diesel fuel to mix with carbonaceous slurry fuel and consequently reduces or eliminates sludge formation.

According to the present invention there is also provided a process of operating a diesel type engine with carbonaceous aqueous slurry fuel, including the steps of: injecting fuel into a combustion chamber via an injector nozzle; actuating a pumping element within a pump chamber to pump pressurised fuel along an injection path from the pumping element to the injector nozzle; supplying fuel to the injection path via a check valve; wherein an outlet region immediately downstream of the check valve is exposed to pressurised fuel flow between the pumping element and the injector nozzle to reduce or eliminate stagnant fuel zones in the outlet region or to maintain a sufficient shear rate to avoid fuel segregation of the fuel in the outlet region.

The avoidance of fuel segregation can, for example, involve maintaining a substantially homogenous carbonaceous slurry fuel. That is, avoiding segregation of the carbonaceous particulate from the liquid portion of the slurry fuel which can cause carbonaceous particles to settle and form sludge. In some instances, this can be achieved by maintaining a sufficient rate of shear throughout the fuel system. This outcome can also be achieved or can be facilitated by reducing or eliminating stagnant fuel zones in the outlet region.

The required shear rate to avoid segregation of the fuel will depend upon the rheological characteristics of the fuel. In embodiments comprising viscous fuels with a viscosity that is greater than or equal to about 1000 mPa·s at 25° C. at a shear rate of 750/s and ratio of recess length to valve seat diameter is preferably in the range of 0 to 2 in the fuel injection arrangement. Alternatively, the check valve can include a valve seat located on a protrusion which extends into the injection path. More preferably, the ratio of recess length to valve seat diameter is in the range of 0 to 0.5 or the check valve includes a valve seat located on a protrusion which extends into the injection path.

Carbonaceous slurry fuels for the purposes of the present invention include carbonaceous solid particles suspended in a liquid phase and/or a carbonaceous liquid emulsified in a liquid phase, such as Multiphase Superfine Atomised Residue (MSAR), in which heavy oil is emulsified with an aqueous solution. The liquid phase is preferably aqueous, although light hydrocarbon liquids, such as kerosene, may also be used.

In a particular embodiment of the above-described process, the fuel has a viscosity that is greater than or equal to about 1000 mPA·s at 25° C. at a shear rate of 750/s and ratio of recess length to valve seat diameter in the range of 0 to 2 in the fuel injection arrangement or the check valve includes a valve seat located on a protrusion which extends into the injection path. In a process according to the present invention, the ratio of recess length to valve seat diameter can be in the range of 0 to 0.5 or the check valve can include a valve seat located on a protrusion which extends into the injection path. In a particular embodiment, the ratio of the recess diameter to the valve seat diameter if greater than 0.5 and less than 1.5.

BRIEF DESCRIPTION OF DRAWINGS

The present invention will now be described with reference to the figures of the accompanying drawings, which illustrate particular preferred embodiments of the present invention, wherein.

DETAILED DESCRIPTION

Figure 1A:
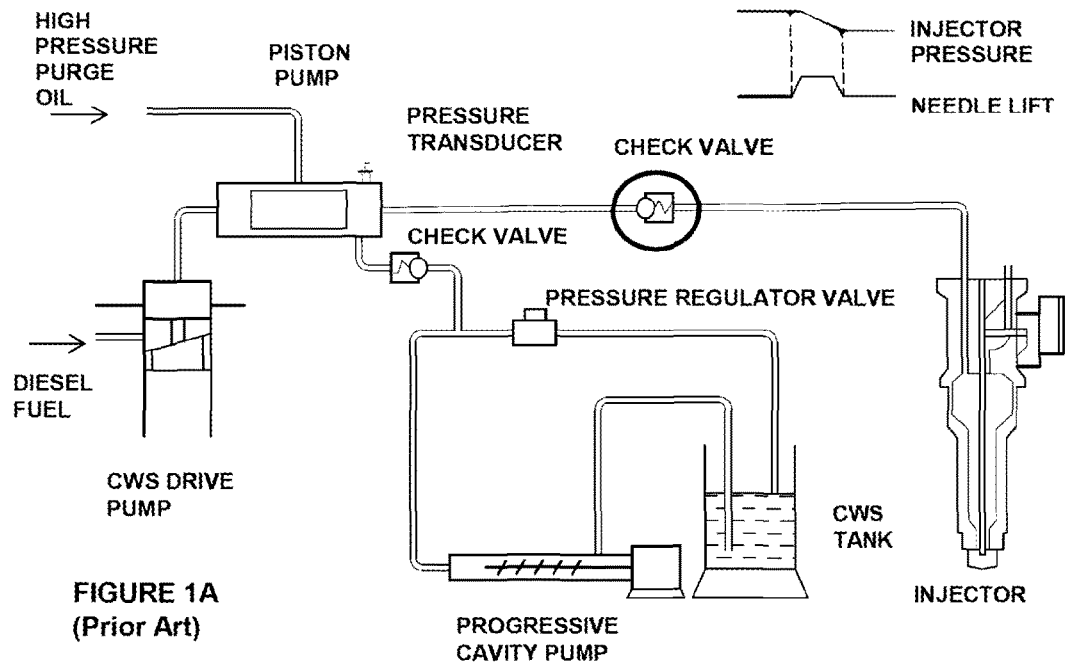
FIG. 1A illustrates a first prior art coal-water slurry injection arrangement.
Figure 1B:
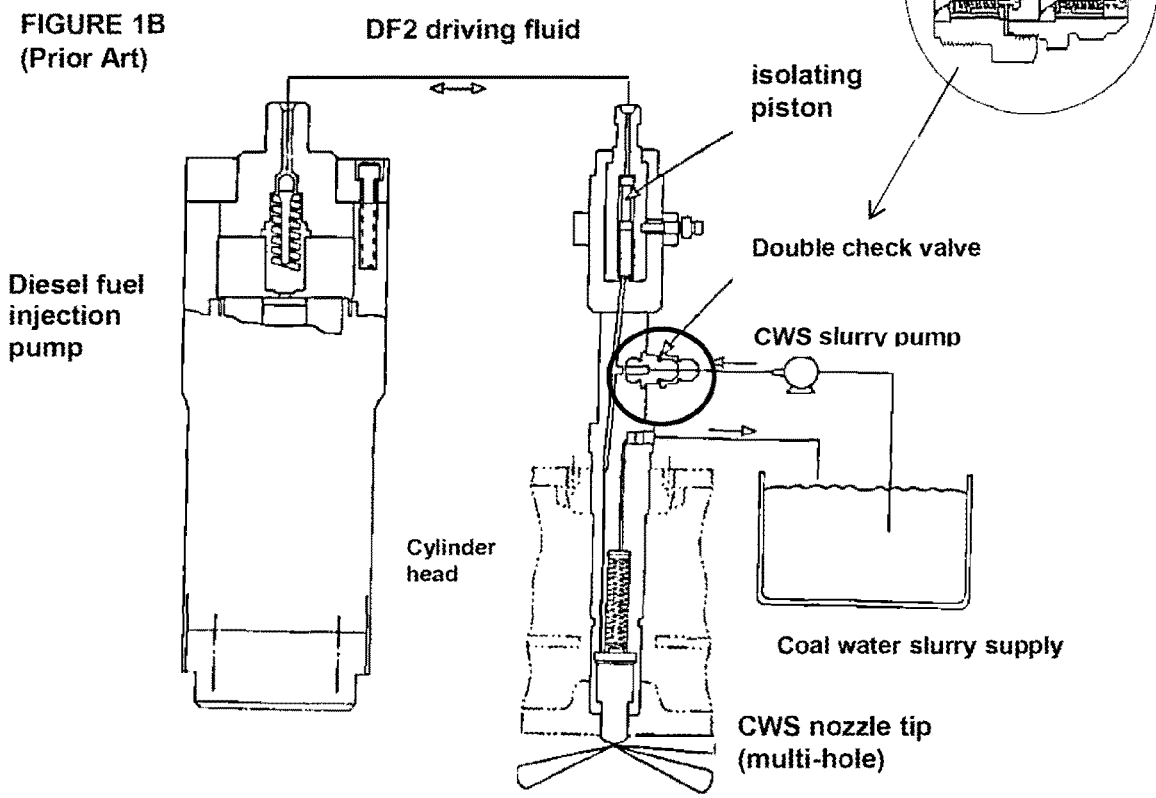
FIG. 1B illustrates a second coal-water slurry injection arrangement.
Figure 10:
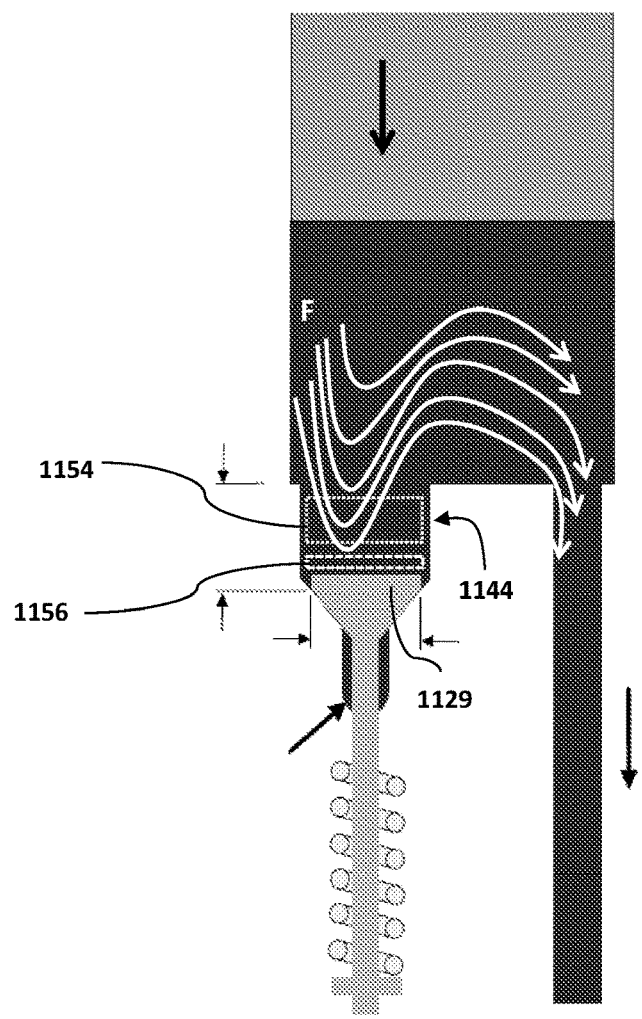
FIG. 10 illustrates a variation on the embodiment in FIG. 9B in which fuel flow along the injection path does not contact the check valve.

FIGS. 1A and 1B exemplify two prior art Coal-Water Slurry (CWS) injection systems illustrating the arrangement of the fuel check-valves (circled). FIGS. 10 and 10 schematically illustrate examples of existing check valve arrangements configured for use with slurry or emulsion fuels, for example carbonaceous aqueous fuels such as coal-water slurries.

Figure 1C:
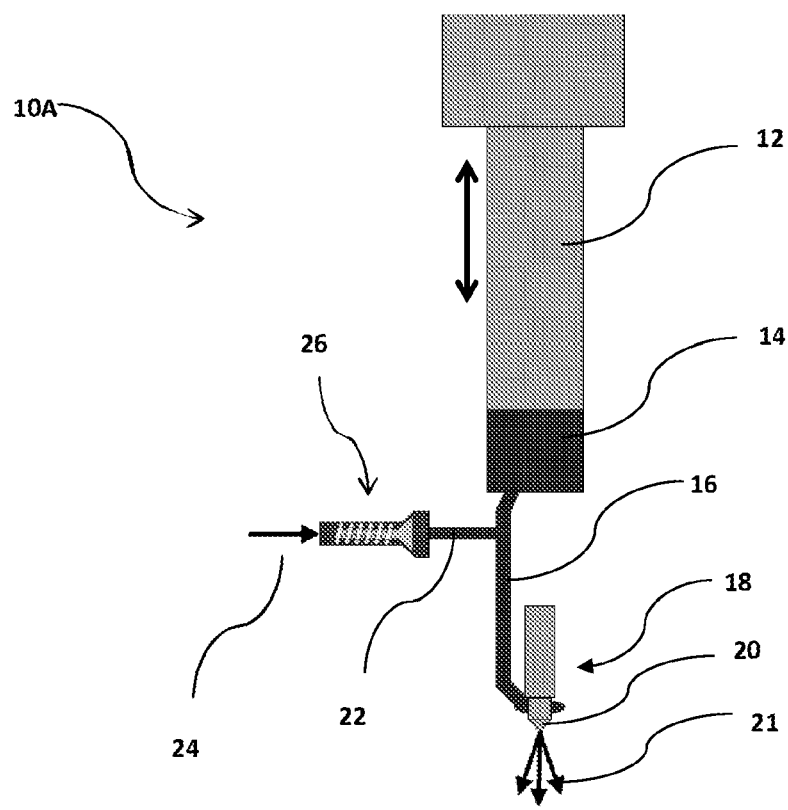
FIG. 1C is a schematic of a first prior art check valve arrangement.
Figure 1D:
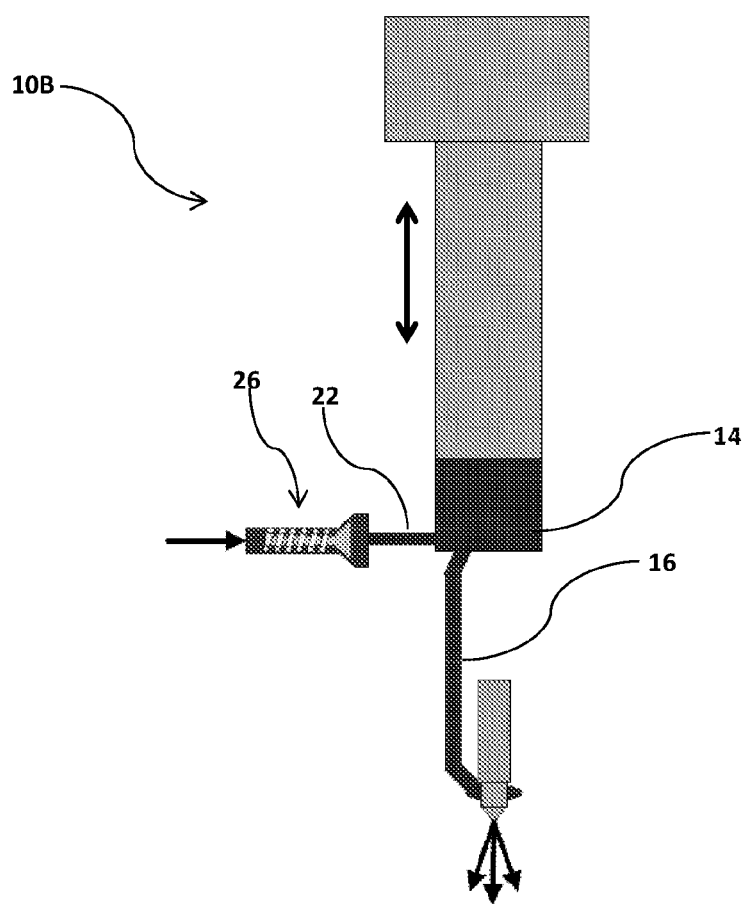
FIG. 1D is a schematic of a second prior art check valve arrangement.

FIG. 1C illustrates a first prior art arrangement 10A wherein a plunger 12 is arranged for sliding movement within a pump chamber 14. A fuel duct 16 connects pump chamber 14 to a nozzle assembly 18 which includes an injector nozzle 20 for delivering a fuel spray 21 to a combustion chamber (not shown). Fuel is supplied to the fuel duct 16 from a fuel supply 24 via a fuel inlet conduit 22. A check valve 26 is positioned upstream of conduit 22 for regulating fuel flow from fuel supply 24 to conduit 22. FIG. 1D illustrates a second prior art arrangement 10B which is a variation of the prior arrangement 10A in FIG. 1C insofar as fuel inlet conduit 22 communicates with pump chamber 14 as opposed to fuel duct 16.

In both of these prior art arrangements 10A, 10B check valve 26 communicates with the fuel injection system via a fuel conduit 22 which is typically narrow in diameter. In each arrangement, check valve 26 is spaced away from the pump chamber 14 and fuel duct 16 so as to be isolated from the pressurised fuel flow generated therein by downward movement the plunger 12. As discussed in the foregoing, the Applicant has identified that these prior arrangements tend to experience sludge formation in the region around the check valve 26 and, in particular, within the fuel inlet conduit 22 immediately downstream of the check valve 26. In addition to sludge formation in this region contributing to unreliable operation of check valve 26, sludge formed within conduit 22 can periodically shed and be ingested within nozzle arrangement 20 causing blockages and other malfunctions downstream of check valve 26.

Figure 2:
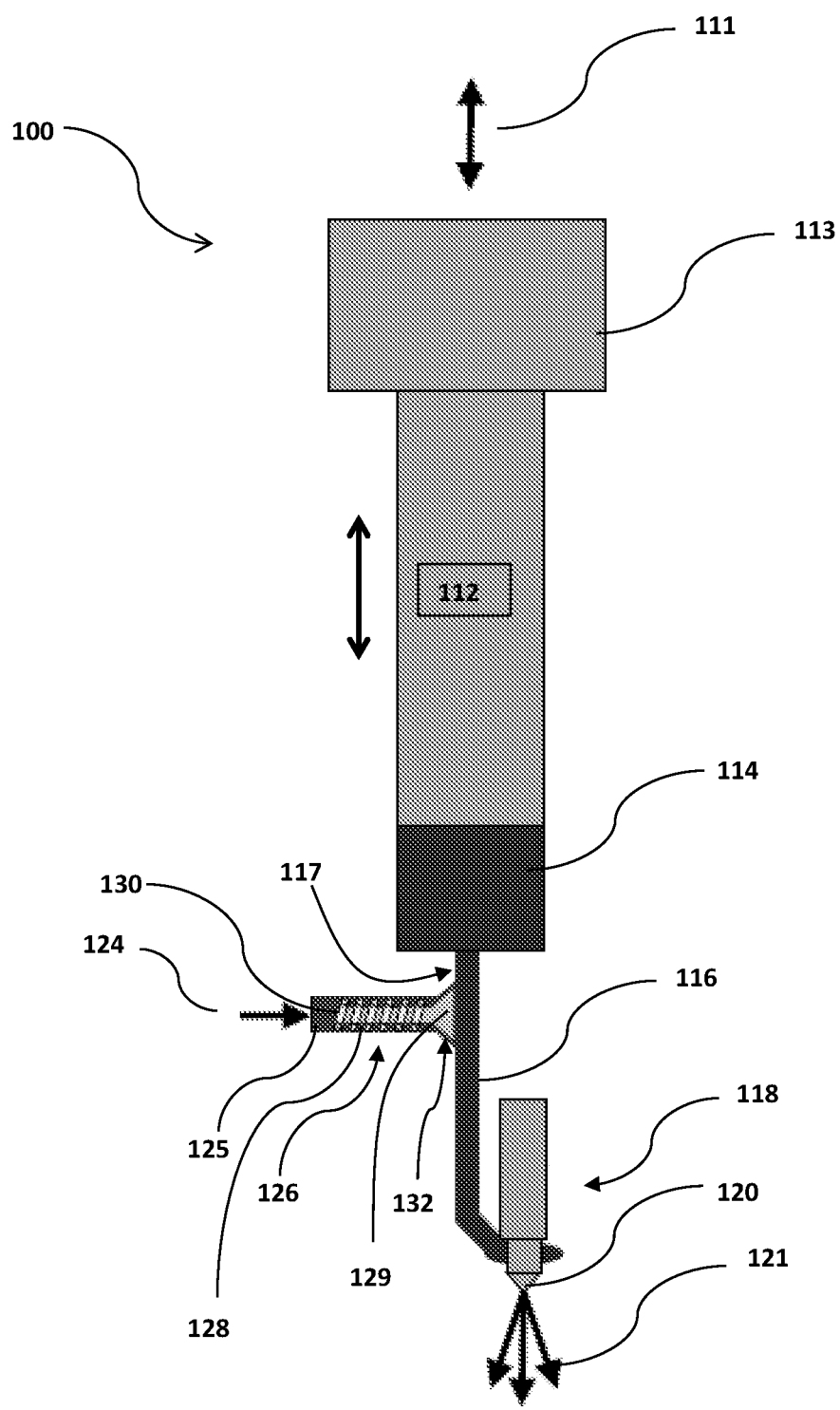
FIG. 2 is a schematic of a first embodiment of the present invention in which a spring-loaded check valve is located within a fuel inlet conduit on the low pressure side of the valve seat.

Turning now to FIG. 2, there is illustrated a fuel injection arrangement 100 according to a first embodiment of the present invention. Arrangement 100 includes an injector nozzle 120 for injecting a fuel spray 121 into a combustion chamber (not shown). Injector nozzle 120 is part of a larger injector nozzle assembly 118 which includes an internal spring-loaded and normally closed nozzle valve (not shown) configured to open when pressure in the upstream fuel line increases to a predetermined valve opening pressure. Upon opening of the normally closed nozzle valve, fuel spray 121 is injected into the combustion chamber until the subsequent reduction in upstream fuel line pressure reduces below the nozzle valve opening pressure whereupon the nozzle valve returns to its normally closed position and fuel spray 121 into the combustion chamber is terminated until the next injection event.

The fuel line immediately upstream of the injector nozzle assembly 118 comprises a fuel duct 116 communicating between the injector nozzle assembly 118 and a pump chamber 114 in which a fuel pumping element is housed. Fuel pumping element comprises a plunger 112 including a plunger head 113 acted upon by an actuating fluid 111 configured to periodically actuate downward movement of plunger 112. Movement of plunger 112 within pump chamber is therefore controlled by actuating fluid 111 which is part of a larger hydraulic system that is not illustrated and which will be readily appreciated by a person skilled in the art. One such example of a hydraulic actuating system suitable for use with the present invention is described in U.S. Pat. No. 5,056,469. In alternative forms of the invention, a cam system may be used to drive movement of plunger 112.

Upon actuation of plunger head 113 by actuating fluid 111, plunger 112 is driven downward reducing the volume of chamber 114 and increasing the pressure of the fuel within the injection path. Upon reaching the above-noted nozzle valve opening pressure, a passageway through nozzle assembly 118 is opened and an injection event occurs wherein fuel is permitted to spray through nozzle 120 into a combustion chamber. In this regard, the pump chamber 114 and the fuel duct 116 define an injection path along which fuel travels between the plunger 112 and the injector nozzle 120.

The injection path is connected to a fuel supply 124 which is provided at relatively lower pressure (for example, 20 bar) to the injection arrangement 100 by an external fuel pump (not shown). Fuel supply 124 is provided via inlet conduit 125 in communication with fuel duct 116. A check valve 126 comprising a spring-loaded and normally-closed poppet valve is located within conduit 125 to regulate fuel flow from fuel supply 124 to fuel duct 116. Check valve 126 includes a valve stem 128 and a conical valve head 129 seated within a corresponding valve seat 132. Valve stem 128 is positioned with a helical spring 130 biasing check valve 126 to its normally-closed position in which valve head 129 is seated within valve seat 132 and in which the fuel supply 124 through check valve 126 is closed.

At the conclusion of the injection event, pressure within the injection path (including fuel duct 116) reduces causing the nozzle valve within nozzle assembly 118 to close. The pressure within actuating fluid 111 is concurrently lowered by the actuating fluid system (not shown) causing the pressure within the pump chamber 114 and inlet duct 116 to drop below the pressure of fuel supply 124. Once the pressure differential over check valve 126 reaches a predetermined opening level, the bias applied by helical spring 130 is overcome and check valve 126 opens to permit fuel flow into fuel duct 116 through a check valve outlet defined by valve seat 132. As illustrated in FIG. 2, valve seat 132 defines a depression in a wall of the injection path which is comprised by wall 117 of fuel duct 116. Check valve 126 is thereby integrated within wall 117 at a periphery of the injection path within fuel duct 116. Fuel exiting from check valve 126 is therefore directly introduced into fuel duct 116 and thus directly introduced into the injection path.

Injection arrangement 100 is similar to previous arrangements 10A and 10B insofar as the configuration and operation of plunger 112, fuel chamber 114, fuel duct 116 and nozzle arrangement 120. However, in contrast to previous systems, the check valve 126 of fuel injection arrangement 100 is arranged such that the fuel outlet region immediately downstream of check valve 126 is exposed to the pressurised fuel flow travelling toward nozzle arrangement 120 under the influence of plunger 112. In particular, the valve seat 132 of check valve 126 is integrated within wall 117 of fuel duct 116 such that the outlet region of check valve 126 is within the injection path defined by the volumes of pump chamber 114 and fuel duct 116. Upon downward movement of plunger 112, the outlet region immediately downstream of check valve 124 is flushed by fuel flow along fuel duct 116 toward nozzle arrangement 120. In arrangement 100, a downstream surface of valve stem 128 is also exposed to fuel flow within the injection path and is similarly flushed. Exposure 128 to the injection path fuel flow advantageously eliminate or reduces areas of stagnant flow around the outlet region and the downstream surface of the valve stem therefore preventing or reducing the build-up or carbonaceous (or other) particulate which can lead to the formation of valve-blocking and/or nozzle-blocking sludge.

Figure 3:
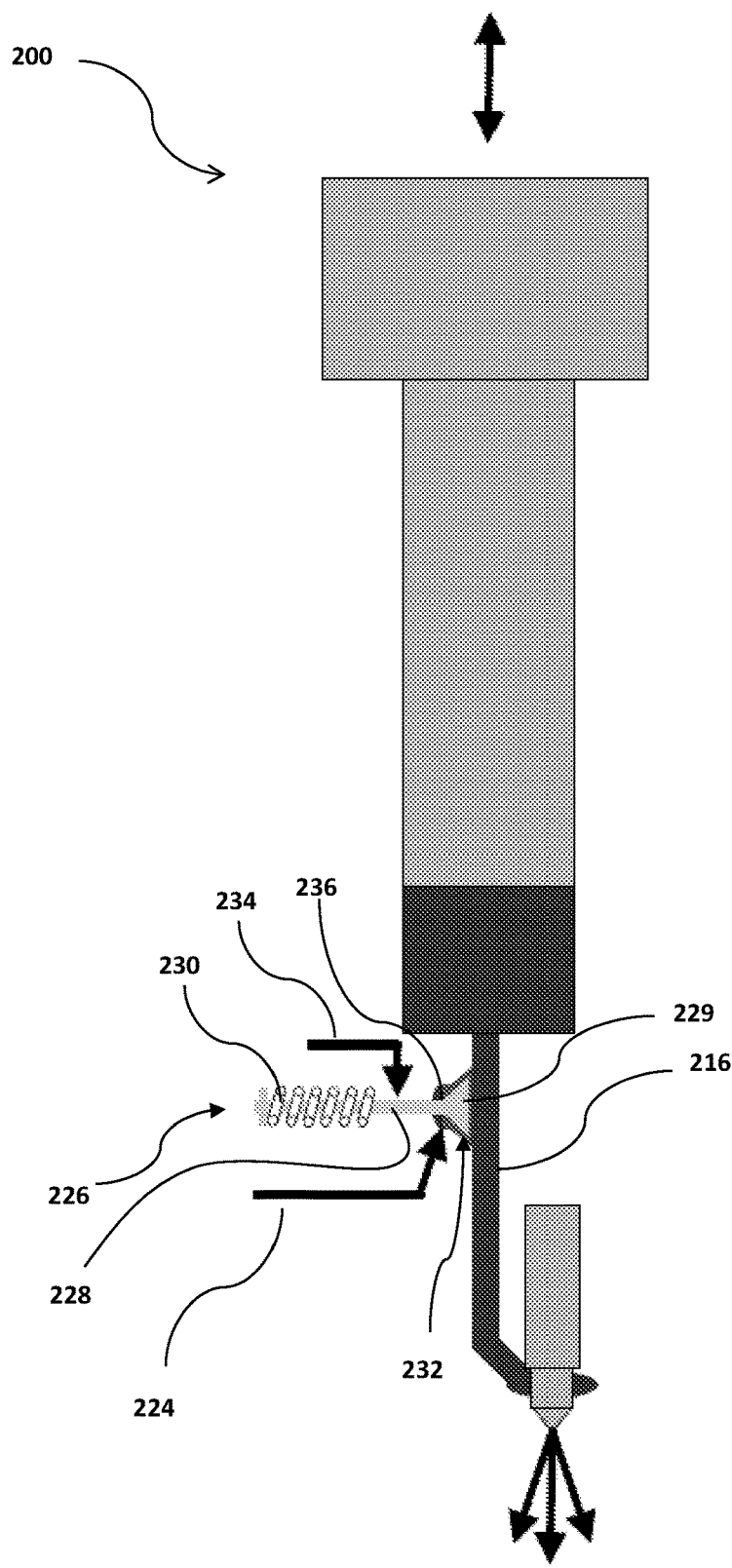
FIG. 3 is a schematic of a second embodiment of the present invention in which the spring of a spring-loaded check valve is isolated from the fuel inlet.

FIG. 3 illustrates a second embodiment of the present invention comprising fuel injection arrangement 200 which provides a variation on the arrangement of check valve 126 illustrated and described above with respect to FIG. 2. Arrangement 200 includes a check valve 226 comprising a spring-loaded normally-closed poppet valve similar to the arrangement of check valve 126 in FIG. 2 except that valve stem 228 and helical spring 230 are locate outside of the fuel supply 224 which communicates with a small fuel chamber 236 located behind valve seat 232 and upstream of valve head 229. Valve stem 228 extends through an opening in the fuel inlet chamber 236. Seal oil 234 is applied to valve stem 228 within a stem housing (not shown) at higher pressure than the fuel within the fuel inlet chamber 236 to prevent fuel ingress from the inlet chamber 236 into the stem housing. This form of the invention advantageously isolates the valve stem 228 and valve spring 230 from the fuel supply 224 further reducing the potential for clogging by providing a more streamlined flow path through check valve 226.

Figure 4:
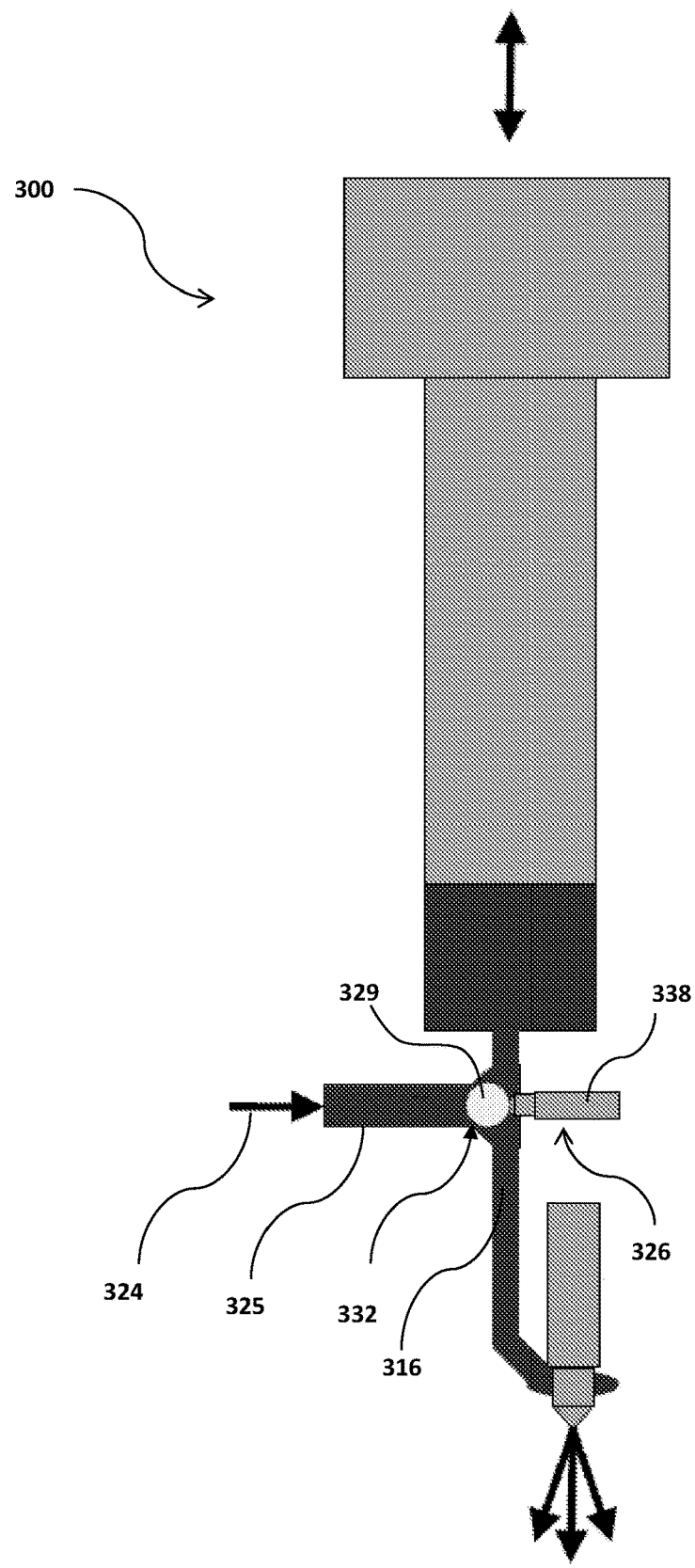
FIG. 4 is a schematic of a third embodiment of the present invention in which the check valve is provided by a ball valve arranged on the high pressure side of the valve seat.

FIG. 4 illustrates a fuel injection arrangement 300 comprising a third embodiment of the present invention. In contrast to the spring-loaded poppet valves of previous injection arrangements 100 and 200, arrangement 300 includes a check valve comprised of a floating ball check valve 326. In alternative embodiments of the present invention, check valve 326 could comprise alternative floating check valves such as a floating poppet valve. As illustrated in FIG. 4, ball check valve 326 includes a floating ball 329 normally seated in valve seat 332 and retained therein by the pressure differential between the injection path and the fuel inlet conduit 325. An extendable follower 338 is located adjacent to ball 329 limiting the range of movement of ball 329. In particular embodiments, the follower is spring-loaded to urge the ball toward the valve seat. A decrease in pressure within the injection path on the downstream side of check valve 326 causes floating ball 329 to unseat from valve seat 332 and thereby opens check valve 326 permitting fuel flow from inlet conduit into fuel duct 316. As with injection arrangement 200, injection arrangement 300 locates the check valve outside of inlet conduit 325 reducing the potential for clogging. The provision of a floating check valve is also advantageous in that it tends to even our wear, prevent clogging and also improve seating contact by eliminating uneven deposition of particles on the valve seat.

Figure 5:
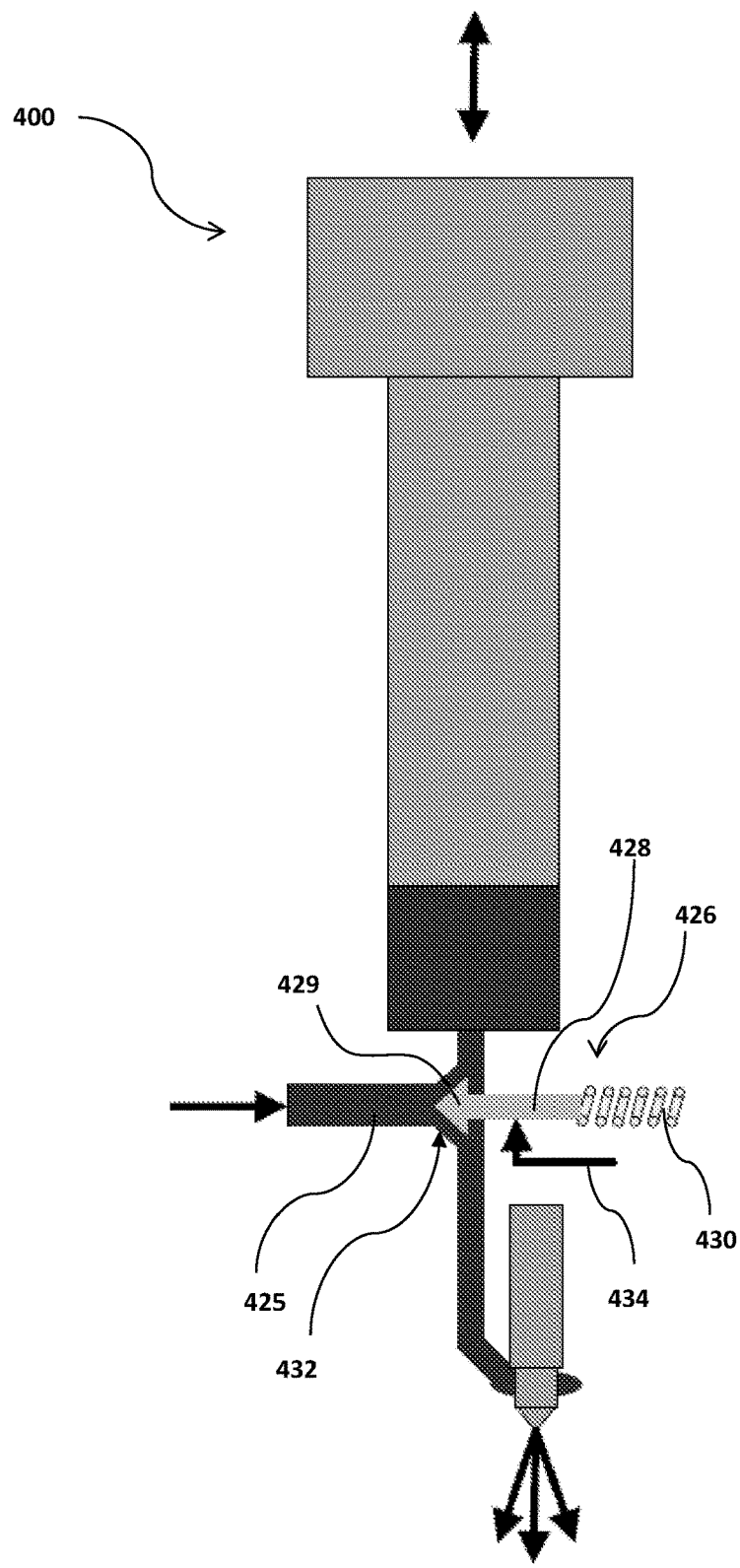
FIG. 5 is a schematic of a fourth embodiment of the present invention in which a spring-loaded check valve is arranged on the high-pressure side of the valve seat.

FIG. 5 illustrates a fuel injection arrangement 400 comprising a fourth embodiment of the present invention. Arrangement 400 is similar to arrangement 200 in that a check valve 426 comprises a spring loaded check valve positioned outside of the fuel inlet conduit 425 and a high pressure seal oil supply 434 applied to valve stem 428 to prevent fuel ingress. However, in contrast to check valve 226 of arrangement 200, check valve 426 is located on the injection path side of valve seat 432. In some embodiments, check valve 426 can include small vanes or scallops in either the valve head 429 immediately upstream of valve seat 432 and/or on the periphery of the valve stem 428 immediately downstream of the valve seat. Contact between oncoming fuel flow and the vanes or scallops on the poppet cause rotation of the poppet advantageously reducing valve seat wear as well as further facilitating cleaning or flushing of the valve during use thereby further reducing sludge formation.

Figure 6:
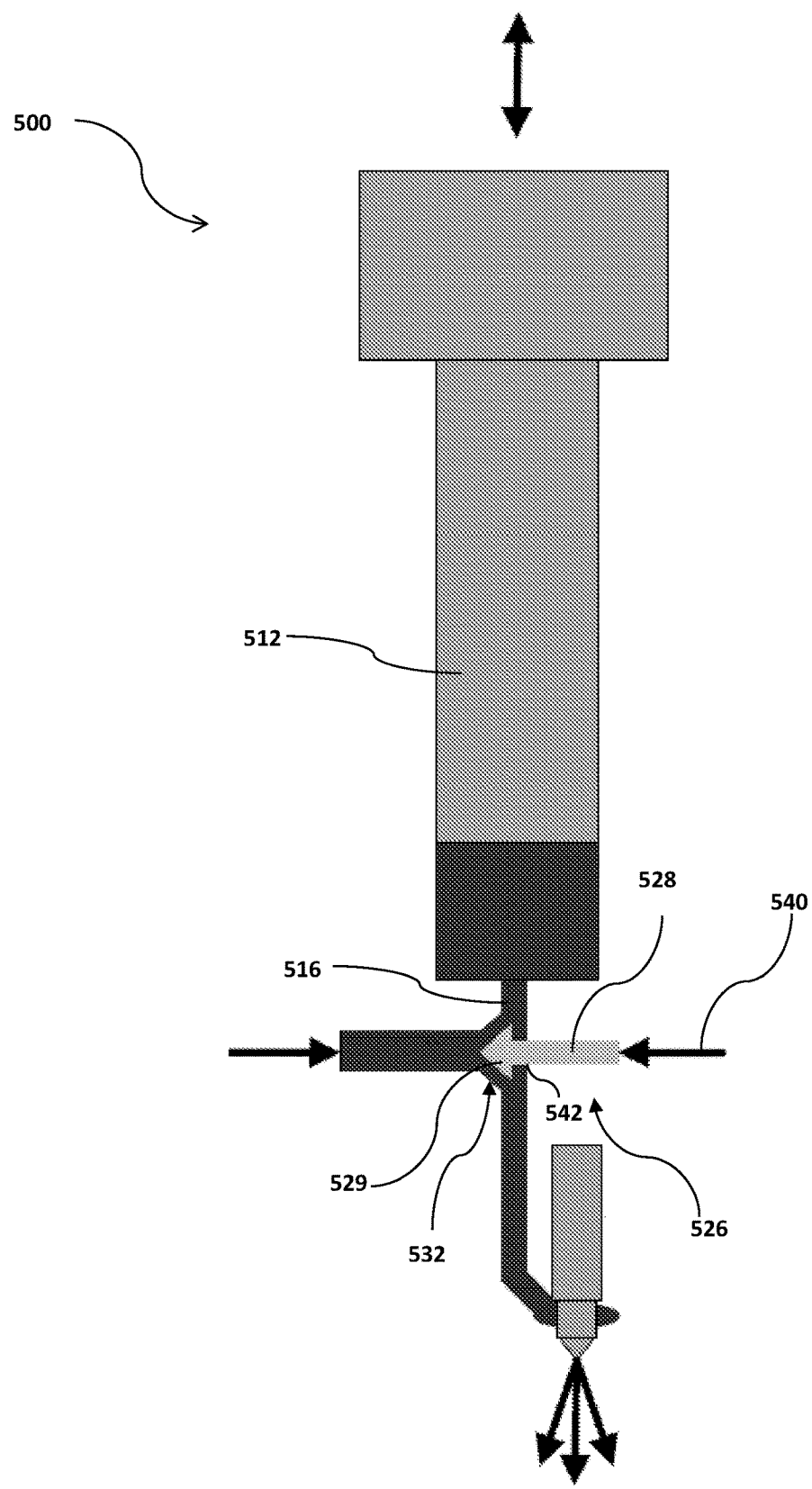
FIG. 6 is a schematic of a fifth embodiment of the present invention in which a hydraulically operated check valve is arranged on the high-pressure side of the valve seat.

FIG. 6 illustrates a fuel injection arrangement 500 comprising a fifth embodiment of the present invention. Arrangement 500 is similar to arrangement 400 insofar as it includes a poppet valve 526 arranged on the injection path side of a valve seat 532. However, in contrast to check valve 426 which is spring-operated, check valve 526 is hydraulically actuated by a valve-actuating fluid 540 applied to the valve stem 528 in order to actuate valve 526 toward valve seat 532. Valve-actuating fluid 540 can be applied to the valve stem 528 shortly before the injection event and released after the injection event starts or is completed. As illustrated in FIG. 6, valve stem 428 extends through an opening 542 in fuel duct 516 and into the injection path. Valve-actuating fluid applied to the rear of stem 528 can be provided at sufficiently high pressure to prevent ingress of fuel from the injection path through opening 542. In this regard, valve-actuating fluid 540 can provide both the closing force and the seal oil to seal the valve spindle thereby performing the dual functions of both the helical spring 430 and seal oil supply 434 in arrangement 400. Supply and pressure adjustment of valve actuating fluid 540 can be controlled by a hydraulic check valve actuation system external and independent of the fuel pressure within the injection path. The check valve actuation system may, for example, be connected to an electronic engine control unit such that the fuel pulses delivered through check valve 526 are not necessarily dependent upon the movement of plunger 512. This form of the invention therefore permits selective operation of the check valve independent of the fuel pumping element. Advantageously, this form of the invention allows the opening/closing timing of check valve 526 to be precisely controlled which, in some instances, could allow for tuning to achieve optimal fuel injection leading to increased engine efficiency.

As will be appreciate with reference to FIGS. 2 to 6, the check valve of the present invention can be configured in a variety of ways, each exposing an outlet region immediately downstream of the check valve to the desirable flushing effects of the high pressure fuel flow travelling along the injection path toward the injector nozzle. FIGS. 2 to 6 illustrated embodiments of the invention where the check valve communicated directly with the fuel duct extending between the pump chamber and the injector nozzle. However, as discussed in the foregoing, the check valve of the present invention can also be positioned in a variety of alternative locations along the injection path.

Figure 7:
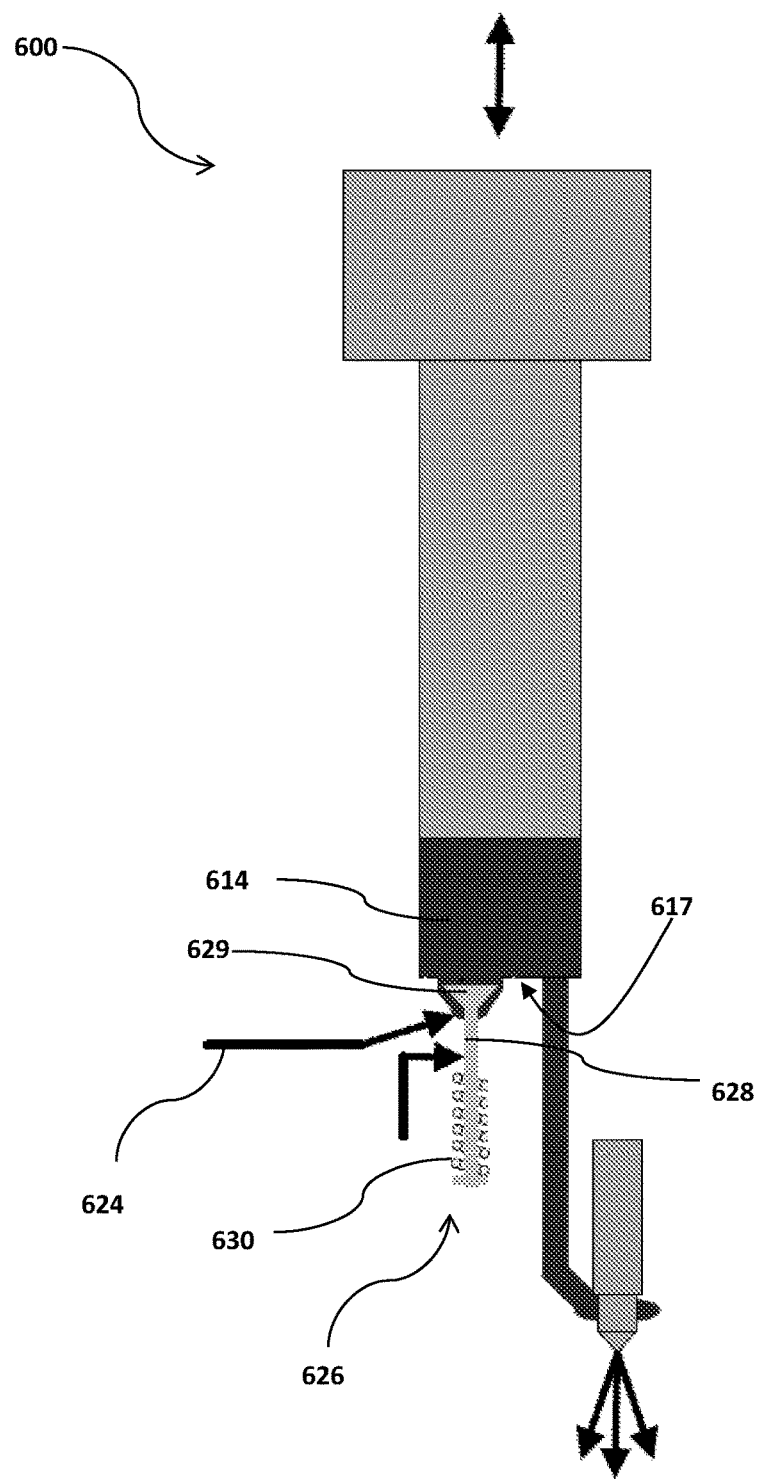
FIG. 7 illustrates an embodiment of the invention where the check valve communicates directly with the pump chamber.

In this regard, FIG. 7 illustrates a sixth embodiment of the present invention whereby fuel injection arrangement 600 includes a spring loaded check valve 626 communicating directly with the pump chamber 614 and, in particular, through a base of pump chamber 614. The arrangement of check valve 626 is otherwise equivalent to that of check valve 236 illustrated in FIG. 3 insofar as it includes an outwardly-opening spring-loaded poppet valve having a valve stem 628 and helical spring 630 external to and isolated from a fuel inlet supply 624. Valve seat 632 is integrated into a wall of the injection path which comprises a base wall 617 of pump chamber 614. The outlet region of check valve 626 is therefore exposed to fuel flow in the injection path in the same manner as the foregoing embodiments albeit at a different location along the injection path.

Figure 8A:
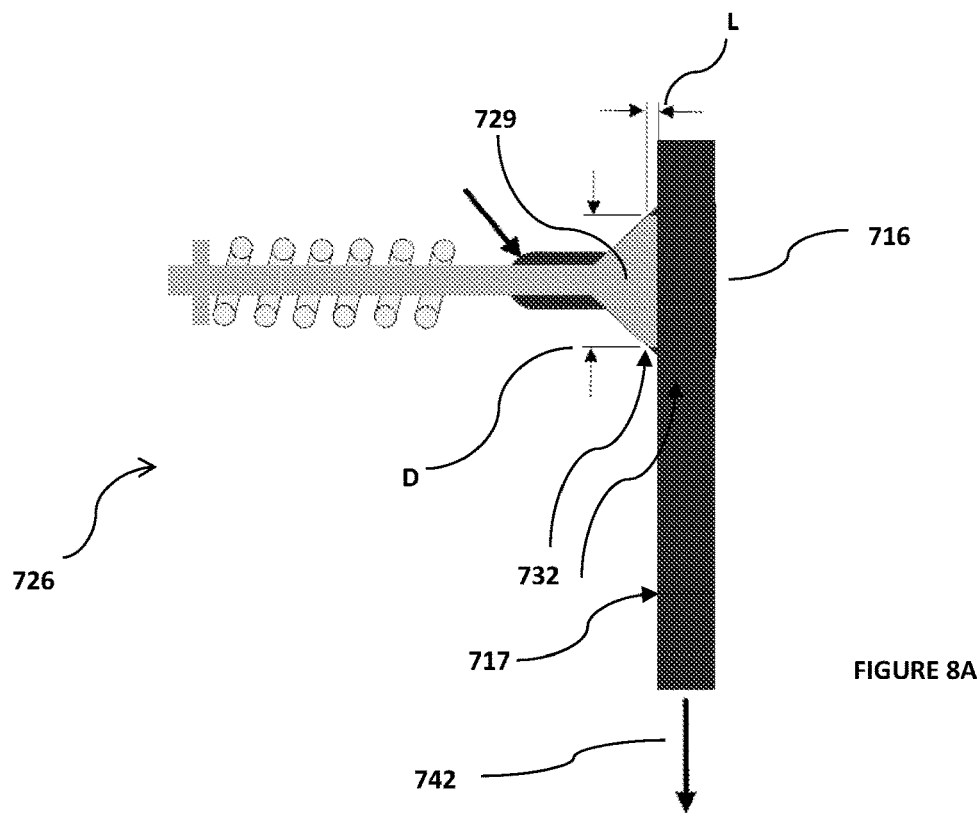
FIG. 8A illustrates an embodiment of the invention where the check valve seat defines a depression in a wall of the fuel duct.

The first to sixth embodiments of the present invention illustrated in FIGS. 2 to 7 each include a valve seat which defines a depression in a wall of the injection path. That is, the valve seat is located at the periphery of the injection path (i.e. at the perimeter of either the pump chamber or the fuel duct). A closer perspective of an example of this configuration is provided in FIG. 8A wherein check valve 726 is arranged such that valve seat 732 defines a depression within a wall of the injection path which is defined, in this embodiment, by wall 717 of fuel duct 716. Check valve 726 is arranged such that the downstream surface of valve head 729 is, in its closed position, generally flush or co-planar with wall 717. As illustrated in FIG. 8A, a distance 'L' between the outer diameter of the valve seat 732 and the commencement of the injection path at wall 717 is negligible. In this regard, a ratio between L (the spacing of the valve seat to the injection path) and D' (the diameter of the valve seat 732) is either zero or sufficiently small to be approximated to zero. Accordingly, the L/D ratio in each of FIGS. 2 to 8A is approximately zero.

It will be appreciated that this arrangement locates the outlet region/volume immediately downstream of the check valve outlet within the injection path and therefore exposes the outlet region to the flushing effects of the high pressure fuel flow 742 extending therethrough. Moreover, this arrangement can advantageously expose a downstream surface of the check valve to the desirable flushing effects of the injection path fuel flow. By way of example, arrangements 200, 300 and 600 can tend to expose a downstream surface of the valve heads 129, 229, 629 and 729 to the fuel flow within the injection path. Arrangement 300 may expose a downstream side of floating ball 329 and a portion of follower 338. Arrangements 400 and 500 expose a downstream side of valve heads 429 and 529 as well as the portion of valve stems 428 and 528 which are located within the injection path. It will be appreciated that said exposure to the high pressure fuel flow in the injection path can increase circulation and can reduce sediment and particulate build-up in and around these surfaces leading to a reduction in the formation of sludge thereon.

The advantages of the present invention may be enhanced by locating the check valve outlet as close to the injection path as possible. For example an I' value that is very small or zero corresponds to an arrangement wherein the outer diameter of the valve seat is located at, or very close to, the periphery of the injection path. However, it will be appreciated that exposure of the outlet region to fuel flow within the injection path is also possible where the check valve outlet is not located at the immediate periphery of the injection path (i.e. a L value that is greater than zero).

Figure 8B:
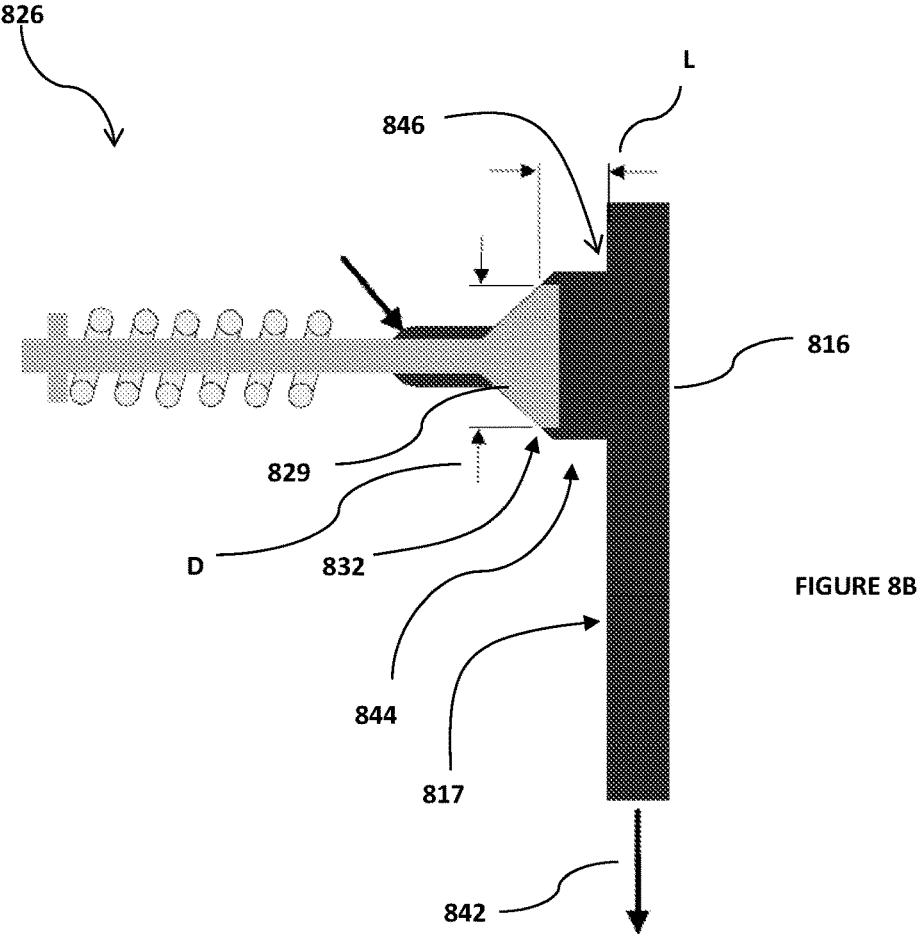
FIG. 8B illustrates an embodiment of the invention where the check valve seat is located within a recess in a wall of the fuel duct.

FIG. 8B exemplifies such an arrangement wherein check valve 826 is spaced away from the injection path within fuel duct 816. In this arrangement, a recess 844 is provided in the injection path wall comprised by fuel duct wall 817. Recess 844 connects to fuel duct 816 at a recess opening 846 through which check valve 826 supplies fuel to fuel duct 816 and to the injection path. Check valve 826 includes a valve head 829 seated within a conical valve seat 832 that is located at the outer end of recess 844 i.e. at the opposite end of the recess 844 from recess opening 846. Recess 844 is cylindrical and has a diameter slightly greater than diameter D of valve seat 832. Check valve 826 is arranged such that the distance between recess opening 846 and the valve seat outer diameter is approximately half the outer diameter D of the valve seat i.e. an L/D ratio of 0.5. As illustrated in FIG. 8B, the minimum cross-sectional area of the recess 844 is slightly larger than the cross-sectional area of valve seat 832.

It will be appreciated with reference to FIG. 8B that the outlet region associated with check valve 826 is located within recess 844 and not within the injection path defined by fuel duct 816. However, the outlet region immediately downstream of the check valve outlet is, in use, nonetheless exposed to the high pressure fuel flow 842 extending along the injection path through fuel duct 816. This is due to the high pressure fuel flow 842 tending to enter recess opening 846 and circulating around recess 844 thereby flushing the outlet region of stagnant particulate and reducing the likelihood of sludge formation therein. In this regard, the outlet region of check valve 826 is indirectly exposed to fuel flow 842 as compared to the outlet region of check valve 726 in FIG. 8A which is directly exposed to fuel flow 742. However it will be appreciated that both direct and indirect exposure achieve the same result of flushing the outlet region.

Figure 9B:
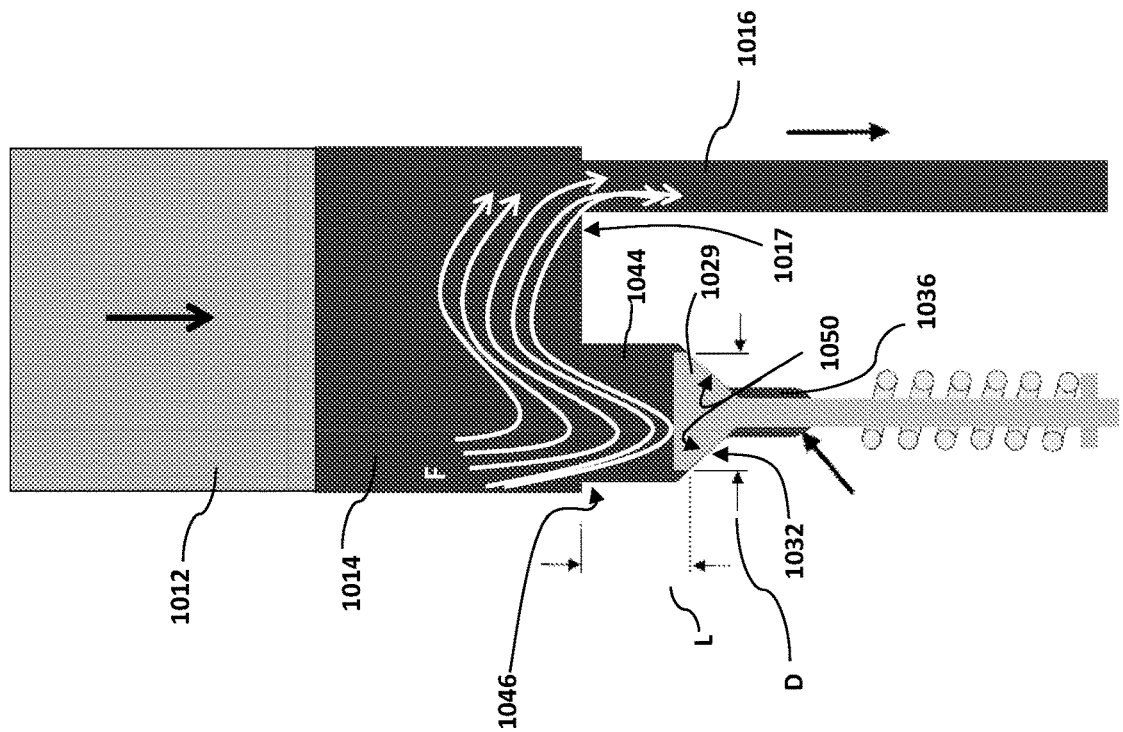
FIG. 9B illustrates an embodiment of the invention where the check valve seat is located within a recess in a base wall of the pump chamber.
Figure 9A:
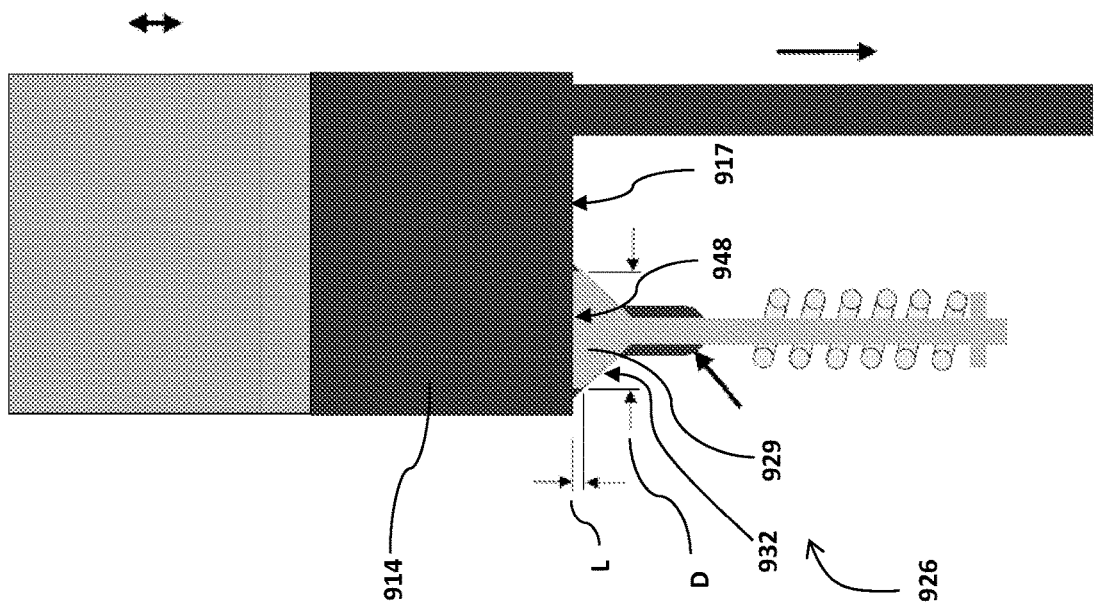
FIG. 9A illustrates an embodiment of the invention where the check valve seat defines a depression in a base wall of the pump chamber.

FIGS. 9A and 9B illustrate a pair of equivalent arrangements to those illustrated in FIGS. 8A and 8B respectively except that the check valves illustrated in FIGS. 9A and 9B are integrated within a base wall of the pump chamber and are therefore arranged to communicate directly with the pump chamber.

As illustrated in FIG. 9A, a downstream surface 948 of valve head 929 is arranged generally flush or co-planar with a wall of the injection path comprised by base wall 917 of pump chamber 914. Valve seat 932 defines a depression or interruption in wall 917 and the outlet region immediately downstream of check valve 926 is located within the injection path in the volume of pump chamber 914. The distance 'L' between the periphery of the injection path at base wall 917 and the valve seat 932 is therefore negligible such that the ratio L/D is also negligible.

FIG. 9B illustrates a check valve 1026 of similar configuration to that of check valve 926 except that check valve 1026 is located within a recess 1044 in base wall 1017 of pump chamber 1014 and is therefore spaced from the injection path within the volume of the pump chamber 1014 by approximately the length of recess 1044. FIG. 9B is illustrated during downward movement of plunger 1012 such that the fuel within pump chamber 1014 is pressurised and fuel flow within the injection path is travelling from the pump chamber 1014 and along fuel duct 1016 toward the injector nozzle assembly (not shown) which at this time is in its open configuration to permit fuel spray through the injector nozzle into the combustion chamber.

At the outer end of recess 1044 i.e. at the opposite end of the recess 1044 from recess opening 1046, a pair of inclined walls 1050 taper towards fuel inlet chamber 1036 located behind valve head 1029. The pair of inclined walls 1050 define valve seat 1032 in which conical valve head 1029 is seated in its normally-closed position. Valve seat 1032 is therefore located at an outer end of recess 1044. The outer diameter of valve seat 1032 is spaced from the recess opening 1046 and the injection path by a distance 'L' approximately equal to the outer diameter of valve seat 1032 such that the L/D ratio is approximately 1. Notwithstanding the outlet of check valve 1026 being spaced apart from the periphery of the injection path (i.e. located adjacent to the injection path), the outlet region of check valve 1026 is configured for flushing exposure to fuel flow within the injection path as illustrated by approximated flow lines F in FIG. 9B. In this regard, the proportions of recess 1044 are configured to facilitate entry of flowlines F into recess 1044 such that check valve outlet region is positioned for flushing exposure to the high pressure fuel flow within the injection path.

Flowlines F represent an approximation of injection path fuel flow during the injection event only (i.e. when fuel is being sprayed into the combustion chamber). It will be appreciated that the flow dynamics will change dramatically during the 'refill' stroke when the plunger is raised and fuel flows through the check valve into the injection path. In this regard, flowlines F are not stable throughout the entire injection process. It will be appreciated that fuel flow within the injection path, particularly within the pump chamber 1014, will be generally turbulent. Exposure of the check valve outlet region in recess 1044 to the turbulent flow within the injection path therefore provides an efficient means by which sediment build-up and sludge formation can be mitigated, counteracted or, in some cases, prevented.

In each embodiment of the present invention, the outlet region immediately downstream of the check valve is arranged for flushing exposure to fuel flow in the injection path, advantageously reducing the risk of sludge formation. In some embodiments, such as those illustrated in FIGS. 2-8A and 10, the check valve outlet is located at the periphery of (or in) the injection path and therefore the check valve will also be exposed to the flushing effects of the pressurised injection path fuel flow. By way of particular example, with reference to FIG. 9A, the downstream surface 948 of valve head 929 will be exposed to fuel flow along the injection path by virtue of its location at the periphery of the injection path within the pump chamber 914.

However exposure of the check valve to fuel flow in the injection path need not necessarily occur in order to achieve the advantages of the present invention. For example, in embodiments of the invention where the check valve is spaced apart from the edge of the injection path (for example FIG. 8B or 9B) then the check valve may or may not be exposed to fuel low between the pump chamber and the injector nozzle. The exposure (or isolation) of the check valve outlet to fuel flow in the injection path may be dependent a number of variables including fuel viscosity. By way of example, fuel flow in the injection path may tend to extend further into the recess when fuel viscosity is low. Accordingly, exposure of the check valve outlet is more likely to occur when lower viscosity fuel is used. This is exemplified in FIG. 9B in which flow lines 'F' contact the downstream side of check valve head 1029. In contrast, FIG. 10 illustrates an arrangement wherein the flow lines F extend through the outlet region 1154 immediately downstream of the check valve outlet but do not extend through a boundary volume 1156 abutting the downstream side of the check valve head 1129.

It will therefore be appreciated that the scope of the present invention includes embodiments wherein the outlet region is arranged for exposure to fuel flow in the injection path however the check valve outlet itself is isolated from exposure to flow in the injection path. As illustrated in FIG. 10, during an injection event when the check valve is closed and pressurised fuel is flowing along the injection path from the pump chamber toward the injector nozzle, the outlet region 1154 immediately downstream of the check valve is exposed to flow from the injection path notwithstanding that the check valve 1129 may be spaced apart from said fuel flow by boundary volume 1156 abutting the downstream side of the check valve head 1229. In this particular embodiment, boundary volume 1156 does not form part of the outlet region 1154. The outlet region 1154 therefore need not necessarily abut or contact the check valve 1129 and may be spaced apart therefrom.

The term 'immediately downstream' will be construed in this context as not necessarily requiring contact or abutment between the outlet region and the check valve. For example, as illustrated in FIG. 10, the outlet region can be a volume in downstream of the outlet and in relatively close proximity thereto but not necessarily abutting the downstream side of the check valve. In some embodiments of the invention sludge formation in the boundary volume 1129 may be reduced or prevented by the outward movement of the valve head 1129. In this regard, the opening/closing movement of the valve head 1129 serves to clean the boundary volume 1129 whilst fuel flow along the injection path entering recess 1144 serves to clean/flush the outlet region 1154 immediately downstream of the valve outlet. It will be appreciated that whilst boundary volume 1129 is isolated from fuel flow F between the pumping element and the injector nozzle, fuel within boundary volume 1129 is not stagnant due to movement of valve head 1129 and also due to boundary volume 1129 being exposed to fuel flow through the check valve toward the injection path As noted above, the exposure or (alternatively) the isolation of the check valve from fuel flow along the injection path could, in some embodiments, be affected by fuel viscosity. Another determining variable may be structure of the check valve such as the L/D ratio. Ratios of zero, close to zero or less than zero generally correspond to arrangements where the check valve is relatively proximate to the injection path. In these arrangements, the check valve outlet is therefore more likely to be exposed to fuel flow in the injection path. In some embodiments, a boundary volume which is isolated from the injection path fuel flow may begin to occur at ratios approximately 0.5-1. The higher the L/D ratio, the greater the spacing between the check valve outlet and the injection path resulting in a higher chance of an isolated boundary volume occurring at the check valve outlet such as that illustrated in FIG. 10. Notwithstanding, whether or not the particular arrangement results in a boundary volume between the check valve outlet and the injection path, it will be appreciated that the outlet region immediately downstream of the check valve outlet is nonetheless exposed to fuel flow within the injection path.

As illustrated in FIGS. 2-8A, the check valve outlet can be located close to or at the periphery to the injection path (i.e. an 'L' value and therefore an L/D value that is very small or zero). In other embodiments, for example FIGS. 8B and 9B, the check valve outlet can be spaced from the periphery of, and located outside of, the injection path (i.e. an I' value and an L/D value that is greater than zero).

Figure 11:
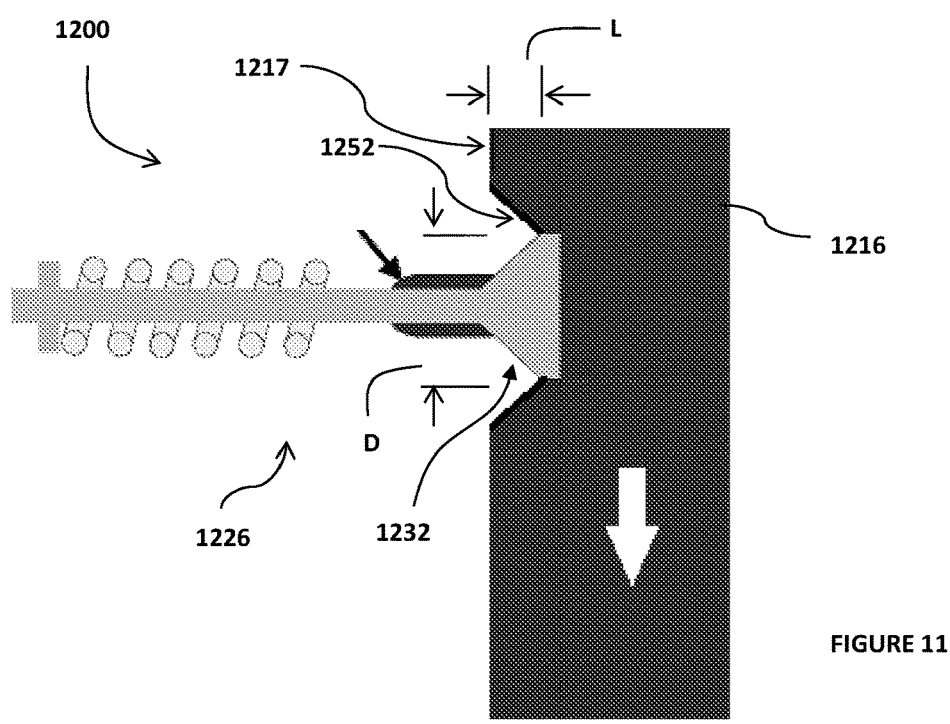
FIG. 11 illustrates an embodiment of the invention in which the check valve is located on a protrusion extending into a fuel duct.

In a further alternative, the check valve is configured to protrude beyond the injection path wall (i.e. beyond the periphery of the injection path). This embodiment is exemplified in FIG. 11 which illustrates a fuel injection arrangement 1200 including a check valve 1226 located in a protrusion 1252 which extends inwardly into fuel duct 1216 from injection path wall 1217. The outer diameter of valve seat 1132 is located inwardly of the injection path wall 1217 and is located within the injection path. The distance between the outer diameter of valve seat 1132 and injection path wall 1217 is indicated as 'L'. If L is treated as a vector, the value of L in FIG. 11 is therefore a negative value denoting that the magnitude of L extends from wall 1217 inwardly (toward the injection path) rather than outwardly, as in the previous Figures. In this regard, it will be appreciated that L can be larger than larger than zero (FIGS. 8B and 9B), close or equal to zero (FIGS. 2-8A) or less than 0 (FIG. 11). In any of these three alternatives, it will be appreciated that the region immediately downstream of the check valve outlet is arranged for pressurised fuel flow to facilitate flushing of the outlet region during fuel flow between the pumping element and the injector nozzle.

It will be appreciated that embodiments of the invention in which the valve seat defines a depression in the injection path wall (i.e. embodiments in which the valve seat is not located within a recess) as illustrated in FIGS. 2 to 8A, provide no constriction between the valve outlet and the injection path. With respect to embodiments of the invention in which the valve seat is located within a recess, recesses 844, 1044 and 1144 in respective FIGS. 8B, 9B and 10 are generally cylindrical. Accordingly, these recesses have a constant cross-sectional area between the valve seat and fuel duct or pump chamber from which the recess extends. The cross-sectional areas of recesses 844, 1044, 1144 are approximately equal or slightly larger than the cross-sectional area of the associated valve seat. Accordingly, fuel flow between the check valve outlet and the pump chamber (in the case of FIGS. 9B and 10) or the fuel duct (in the case of FIG. 8B) encounters no constriction, choke point or bottleneck along the passageway (i.e. along the recess) between the check valve outlet and the injection path.

However, the cross-sectional area of the passageway (i.e. the recess) need not necessarily be equal or greater than the area of the valve seat. In this regard, FIGS. 12A to 12C illustrates three embodiments of the invention in which the respective valve seats are connected to the injection pay via passageways having different cross-sectional areas.

Figure 12A:
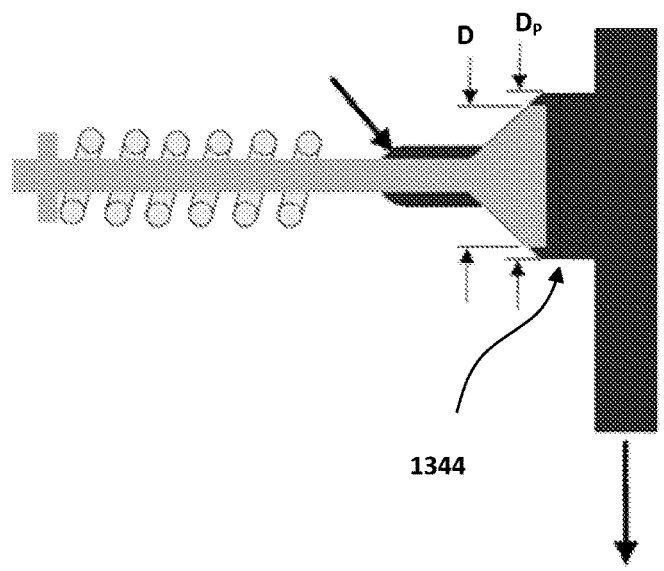
FIG. 12A illustrates an embodiment of the invention in which the check valve outlet is located within a recess of constant cross section.

FIG. 12A illustrates a fuel injection arrangement (equivalent to that of FIG. 8B) in which with the valve-duct passageway (i.e. recess 1344) has a minimum-diameter labelled $D_P$. As noted above, recess 1344 is cylindrical and thus has a constant diameter equal to the minimum-diameter $D_P$. As illustrated in FIG. 12A, recess 1344 has a diameter $D_P$ slightly larger than valve seat diameter D such that the value of $D_P/D$ is greater than 1 and, in the particular illustrated embodiment, approximately 1.15. It will be appreciated that a $D_P/D$ value which is equal to or greater than 1 corresponds to an arrangement without any constriction between the valve outlet and the injection path.

Figure 12B:
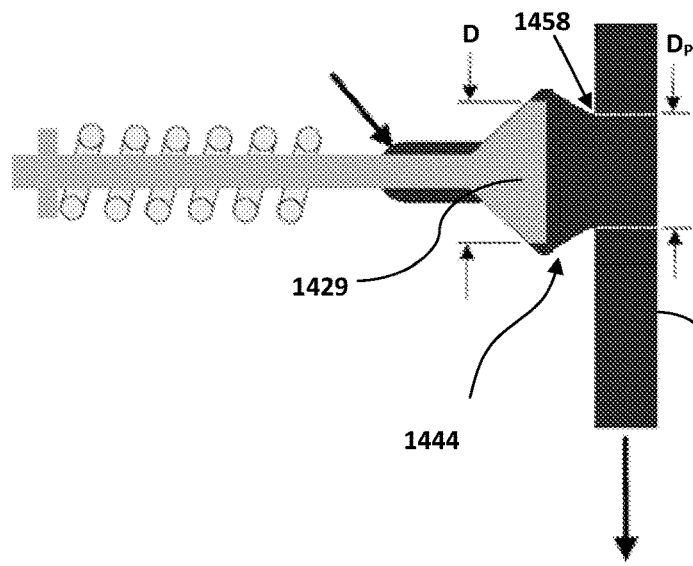
FIG. 12B illustrates an embodiment of the invention in which the check valve outlet is located within a recess of non-constant cross section.
Figure 12C:
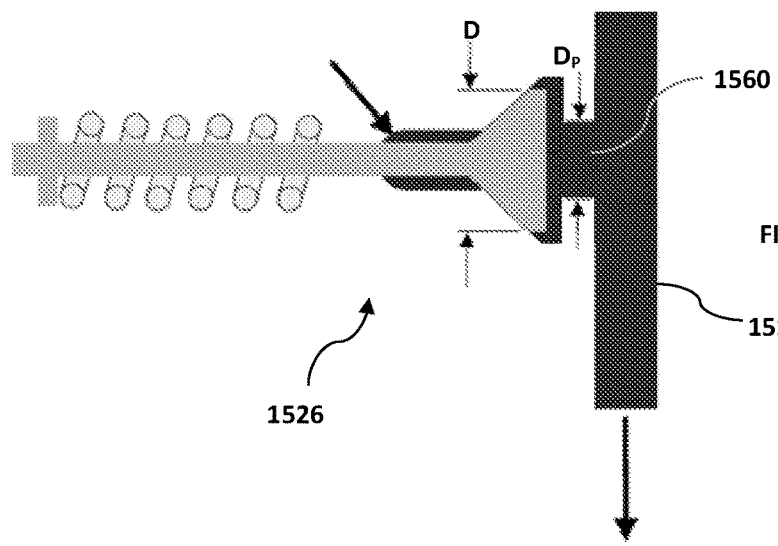
FIG. 12C illustrates an embodiment of the invention in which the check valve outlet is connected to the injection path via a conduit.

FIG. 12B illustrates an alternative embodiment of the present invention in which recess 1444 flares outwardly and therefore increases in cross-sectional area from the fuel duct 1416 toward valve head 1429. The junction of recess 1444 and fuel duct 1416 defines a throat 1458 at which recess 1444 is narrowest and at which minimum recess diameter $D_P$ is therefore measured. In this embodiment, the value of $D_P/D$ is therefore less than zero and, in particular, approximately 0.8. Notwithstanding throat 1458 defining a constriction in the fuel passageway between the valve outlet and fuel duct 1416, the constriction is sufficiently small such that the outlet region immediately downstream of the check valve will nonetheless be exposed to fuel flow along the injection path and the advantages of the present invention can be achieved.

It will be appreciated that fuel flow dynamics are affected by the fuel viscosity in use. Accordingly, the minimum $D_P/D$ ratio at which the outlet region will still be sufficiently exposed to fuel flow in the injection path to reduce or eliminate sludge-forming dead zones could vary depending on the particular fuel being used with the present invention. However, by way of example, FIG. 12C illustrates a particular embodiment of the invention in which the fuel injection arrangement has a $D_P/D$ ratio as low as 0.5. FIG. 12C illustrates a check valve 1526 connected to fuel duct 1516 via a conduit 1560 and which therefore defines the passageway between check valve 1526 and fuel duct 1516. The passageway (i.e. conduit 1560) has a minimum (and constant) diameter $D_P$ which is approximately half the diameter of the valve seat D such that $D_P/D$ is approximately 0.5.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A fuel injection arrangement for a diesel type engine configured to use carbonaceous aqueous slurry fuels, the fuel injection arrangement including:
   an injector nozzle for injecting fuel into a combustion chamber;
   a pump chamber housing a fuel pumping element for generating a pressurised fuel flow to the injector nozzle along an injection path between the pumping element and the injector nozzle; and
   a check valve connected to a fuel supply for regulating and supplying fuel to the injection path via a check valve outlet,
   wherein a region immediately downstream of the check valve outlet defines an outlet region, wherein the outlet region is located within the injection path such that the outlet region is exposed to the pressurised fuel flow to facilitate flushing of the outlet region during fuel flow between the pumping element and the injector nozzle, and wherein a downstream surface of the check valve is exposed to the fuel flow between the pumping element and the injector nozzle.

2. A fuel injection arrangement according to claim 1, wherein the check valve is integrated within an injection path wall at a periphery of the injection path.

3. A fuel injection arrangement according to claim 2, wherein the check valve includes a valve seat which defines a depression in the injection path wall.

4. A fuel injection arrangement according to claim 2, wherein the check valve outlet region is located within a recess in the injection path wall.

5. A fuel injection arrangement according to claim 4, wherein the recess includes a recess opening in the injection path wall.

6. A fuel injection arrangement according to claim 5, wherein the exposure of the outlet region to fuel flow in the injection path is facilitated by the configuration of the recess.

7. A fuel injection arrangement according to claim 6, wherein the check valve includes a valve seat having a cross-sectional area equal to or less than a minimum cross-sectional area of the recess.

8. A fuel injection arrangement according to claim 7, wherein the recess has a minimum diameter equal to or greater than a diameter of the valve seat.

9. A fuel injection arrangement according to claim 6, wherein the recess has a recess length defined as the distance between the recess opening to an outer circumference of the valve seat and wherein the ratio of recess length to valve seat diameter is in the range of 0 to 5.

10. A fuel injection arrangement according to claim 1 wherein the check valve includes a valve seat located on a protrusion which extends into the injection path.

11. A fuel injection arrangement according to claim 1, including a fuel duct communicating between the pump chamber and the injector nozzle, wherein the pump chamber and the fuel duct collectively define the injection path.

12. A fuel injection arrangement according to claim 2, wherein the check valve communicates directly with the pump chamber and the injection path wall is defined by a wall of the pump chamber.

13. A fuel injection arrangement according to claim 1, wherein the check valve is integrated within a base wall or a side wall of the pump chamber.

14. A fuel injection arrangement according to claim 2, wherein the check valve communicates directly with the fuel duct and the injection path wall is defined by a wall of the fuel duct.

15. A fuel injection arrangement according to claim 1, wherein the check valve is actuated by a check valve actuation system independent of fuel pressure within the injection arrangement.

16. A process of operating a diesel type engine comprising a fuel injection arrangement according to claim 1 with carbonaceous aqueous slurry fuel, including the steps of:
   injecting fuel into a combustion chamber via the injector nozzle;
   actuating the fuel pumping element within the pump chamber to pump pressurised fuel along the injection path from the pumping element to the injector nozzle;
   supplying fuel to the injection path via the check valve;
   wherein the outlet region immediately downstream of the check valve is exposed to pressurised fuel flow between the pumping element and the injector nozzle to reduce or eliminate stagnant fuel zones in the outlet region.

17. A process of operating a diesel type engine with carbonaceous aqueous slurry fuel, including the steps of:
   injecting fuel into a combustion chamber via an injector nozzle;
   actuating a pumping element within a pump chamber to pump pressurised fuel along an injection path from the pumping element to the injector nozzle;
   supplying fuel to the injection path via a check valve;
   wherein an outlet region immediately downstream of the check valve is located within the injection path such that the outlet region is exposed to pressurised fuel flow between the pumping element and the injector nozzle to reduce or eliminate stagnant fuel zones in the outlet region or to maintain a sufficient shear rate to avoid segregation of fuel in the outlet region, and wherein a downstream surface of the check valve is exposed to the fuel flow between the pumping element and the injector nozzle.

18. The process according to claim 16, wherein the fuel has a viscosity that is greater than or equal to about 1000 mPA·s at 25° C. at a shear rate of 750/s and ratio of recess length to valve seat diameter is in the range of 0 to 2 in the fuel injection arrangement or the check valve includes a valve seat located on a protrusion which extends into the injection path.

* * * * *